US012565034B2

(12) United States Patent
Thrush et al.

(10) Patent No.: US 12,565,034 B2
(45) Date of Patent: *Mar. 3, 2026

(54) MAT AND METHOD FOR MANUFACTURING THE SAME

(71) Applicant: The Parallax Group International, LLC, Aliso Viejo, CA (US)

(72) Inventors: Bruce A. Thrush, Monarch Beach, CA (US); Tung-An Liu, Changhua County (TW)

(73) Assignee: The Parallax Group International, LLC, Aliso Viejo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/744,620

(22) Filed: Jun. 15, 2024

(65) Prior Publication Data

US 2024/0336052 A1 Oct. 10, 2024

Related U.S. Application Data

(62) Division of application No. 17/891,806, filed on Aug. 19, 2022, now Pat. No. 12,011,910.

(30) Foreign Application Priority Data

Sep. 16, 2021 (TW) ................................. 110134672

(51) Int. Cl.
*D03D 3/08* (2006.01)
*B32B 5/20* (2006.01)
(Continued)

(52) U.S. Cl.
CPC ............ *B32B 38/0004* (2013.01); *B32B 5/20* (2013.01); *B32B 5/32* (2013.01); *B32B 7/022* (2019.01);
(Continued)

(58) Field of Classification Search
CPC ... B32B 5/32; B32B 2250/22; B32B 2270/00; B32B 2305/022
See application file for complete search history.

(56) References Cited

U.S. PATENT DOCUMENTS

| | | | |
|---|---|---|---|
| 34,001 A | 12/1861 | Mayall | |
| 654,532 A | 7/1900 | Furness | |
| | (Continued) | | |

FOREIGN PATENT DOCUMENTS

| | | | |
|---|---|---|---|
| CN | 3235199 | 5/2002 | |
| GB | 2000726 A | 1/1979 | |
| | (Continued) | | |

OTHER PUBLICATIONS

Exhibit 16 to the Request For Ex-Parte Reexamination of U.S. Pat. No. 10,258,179, case 8:16-cv-00929-AG-DFM, Doc 193-22, Plaintiff the Parallax Group International, LLC's Response to defendant Incstores LLC's Request for Admission (Set Three), Jan. 20, 2018, 4 pages.

(Continued)

*Primary Examiner* — Basil S Katcheves
(74) *Attorney, Agent, or Firm* — Heidi Eisenhut; LOZA & LOZA, LLP

(57) ABSTRACT

A mat and a method for manufacturing the same are provided. The mat includes a first foam layer, a second foam layer and a third foam layer. The first foam layer has a first hardness and a first porosity. The second foam layer is connected with the first foam layer and has a second hardness and a second porosity larger than the first porosity. The third foam layer is connected with the second foam layer and has a third hardness and a third porosity smaller than the first porosity. The second foam layer includes a first connecting surface facing the first foam layer and a second connecting surface facing the third foam layer. The contact area between the first connecting surface and the first foam (Continued)

layer is different from the contact area between the second connecting surface and the third foam layer.

5 Claims, 7 Drawing Sheets

(51) Int. Cl.

| | | |
|---|---|---|
| B32B 5/32 | (2006.01) | |
| B32B 7/022 | (2019.01) | |
| B32B 38/00 | (2006.01) | |

(52) U.S. Cl.
CPC ....... *B32B 2250/03* (2013.01); *B32B 2250/22* (2013.01); *B32B 2250/242* (2013.01); *B32B 2266/0221* (2013.01); *B32B 2266/025* (2013.01); *B32B 2270/00* (2013.01); *B32B 2305/022* (2013.01); *B32B 2305/026* (2013.01); *B32B 2307/404* (2013.01); *B32B 2307/536* (2013.01); *B32B 2307/72* (2013.01); *B32B 2307/732* (2013.01); *B32B 2471/04* (2013.01)

(56) References Cited

U.S. PATENT DOCUMENTS

| | | | |
|---|---|---|---|
| 713,420 | A | 11/1902 | Flood |
| 729,923 | A | 6/1903 | Ellis |
| 863,054 | A | 8/1907 | Dickerson |
| D43,499 | S | 2/1913 | Force |
| 2,449,465 | A | 9/1948 | Flaker |
| 3,257,260 | A | 6/1966 | Morgan |
| 3,516,029 | A | 6/1970 | Johnson |
| 3,530,486 | A | 9/1970 | Strider |
| 3,579,704 | A | 5/1971 | Holzl |
| 3,616,029 | A | 10/1971 | Lerman |
| 3,701,214 | A | 10/1972 | Sakamoto |
| 3,793,128 | A | 2/1974 | Chancellor |
| 3,793,129 | A | 2/1974 | Doggart et al. |
| 3,818,085 | A | 6/1974 | Marsland et al. |
| 3,909,996 | A | 10/1975 | Ettlinger et al. |
| 3,954,926 | A * | 5/1976 | Pahl .................... B29C 44/04 264/DIG. 83 |
| 4,018,025 | A | 4/1977 | Collette |
| 4,194,872 | A | 3/1980 | Hinterkeuser et al. |
| 4,287,693 | A | 9/1981 | Collette |
| 4,336,293 | A | 6/1982 | Eiden |
| 4,377,614 | A | 3/1983 | Alfter et al. |
| 4,452,920 | A | 6/1984 | Joubert |
| D274,998 | S | 8/1984 | Johansson |
| D281,752 | S | 12/1985 | David et al. |
| 4,882,245 | A | 11/1989 | Gelorme et al. |
| 4,942,072 | A | 7/1990 | Chung |
| 4,973,505 | A | 11/1990 | Bielous |
| 5,052,158 | A | 10/1991 | Luzansky |
| 5,121,842 | A | 6/1992 | Osborne |
| 5,135,595 | A | 8/1992 | Acocella et al. |
| 5,204,159 | A | 4/1993 | Tan |
| 5,212,842 | A | 5/1993 | Glydon |
| 5,212,843 | A | 5/1993 | Kamata |
| 5,318,645 | A | 6/1994 | Yang |
| 5,318,654 | A | 6/1994 | Maruyama et al. |
| 5,354,402 | A | 10/1994 | Luetkens et al. |
| 5,358,766 | A | 10/1994 | Field |
| D370,818 | S | 6/1996 | D'Alessio |
| 5,560,877 | A | 10/1996 | Yung et al. |
| 5,972,257 | A | 10/1999 | Liu |
| 6,027,599 | A | 2/2000 | Wang |
| 6,129,798 | A | 10/2000 | Yang |
| 6,333,092 | B1 | 12/2001 | Gipple et al. |
| 6,333,766 | B1 | 12/2001 | Kougami et al. |
| 6,346,207 | B1 | 2/2002 | Liu |
| 6,526,705 | B1 | 3/2003 | Macdonald |
| 6,578,324 | B2 | 6/2003 | Kessler et al. |
| 6,588,167 | B2 | 7/2003 | Chang |
| D478,452 | S | 8/2003 | Kafka et al. |
| D478,494 | S | 8/2003 | Arnold |
| 6,623,840 | B2 | 9/2003 | Hainbach |
| 6,761,563 | B1 | 7/2004 | Lin |
| 6,810,834 | B2 | 11/2004 | Hutchings et al. |
| 6,966,155 | B2 | 11/2005 | Nevison |
| D532,238 | S | 11/2006 | Thrush |
| D543,764 | S | 6/2007 | Thrush |
| 7,340,865 | B2 | 3/2008 | Vanderhoef |
| D614,899 | S | 5/2010 | Lai |
| D648,166 | S | 11/2011 | Lu |
| 8,101,272 | B1 * | 1/2012 | Schmidt ............... C04B 35/573 428/297.4 |
| D653,484 | S | 2/2012 | Lai |
| D654,748 | S | 2/2012 | Lu |
| 9,198,317 | B2 | 11/2015 | Sawadski et al. |
| 9,289,085 | B2 | 3/2016 | Thrush |
| D810,465 | S | 2/2018 | Wah |
| 10,172,491 | B2 | 1/2019 | Thrush |
| 10,258,179 | B2 * | 4/2019 | Thrush ................. E01C 13/045 |
| 10,390,647 | B2 | 8/2019 | Thrush |
| 12,011,910 | B2 * | 6/2024 | Thrush ..................... B32B 7/02 |
| 2002/0127369 | A1 | 9/2002 | Ackerman et al. |
| 2003/0096882 | A1 | 5/2003 | Fujita |
| 2003/0191227 | A1 | 10/2003 | Grove et al. |
| 2004/0237194 | A1 | 12/2004 | McMahan |
| 2006/0070314 | A1 | 4/2006 | Jenkins et al. |
| 2006/0070317 | A1 | 4/2006 | Hulls et al. |
| 2007/0056228 | A1 | 3/2007 | Penland et al. |
| 2009/0012713 | A1 | 1/2009 | Clark et al. |
| 2009/0031658 | A1 | 2/2009 | Moller et al. |
| 2009/0047465 | A1 * | 2/2009 | Zafiroglu .................. B32B 3/30 428/85 |
| 2012/0253298 | A1 * | 10/2012 | Henderson ........... A61B 17/064 604/93.01 |
| 2013/0012108 | A1 * | 1/2013 | Li ............................ B24D 3/28 451/529 |
| 2013/0017372 | A1 * | 1/2013 | Mechling ................. A63B 6/00 428/192 |
| 2013/0017373 | A1 * | 1/2013 | Wu ........................ C09D 11/38 427/256 |
| 2014/0224857 | A1 * | 8/2014 | Schmid ............ A61B 17/07292 227/176.1 |
| 2015/0053068 | A1 * | 2/2015 | Miyata ................... G10D 13/03 84/723 |
| 2015/0174826 | A1 * | 6/2015 | Murugesh .............. B33Y 70/00 264/308 |
| 2016/0166099 | A1 | 6/2016 | Thrush |
| 2016/0176021 | A1 * | 6/2016 | Orilall ................. B29C 35/0805 51/296 |
| 2018/0244879 | A1 * | 8/2018 | Takehara .............. B29C 70/465 |
| 2019/0202033 | A1 * | 7/2019 | Castagna ............... B24D 3/007 |
| 2020/0008514 | A1 * | 1/2020 | Dua ..................... B29D 35/146 |

FOREIGN PATENT DOCUMENTS

| | | | |
|---|---|---|---|
| WO | 2002/068515 | A1 | 9/2002 |
| WO | 2003/000994 | A1 | 1/2003 |

OTHER PUBLICATIONS

Exhibit 17 to the Request for Ex-Parte Reexamination of U.S. Pat. No. 10,258,179, Bruce A. Thrush, Decision on Appeal 2014-005772, U.S. Appl. No. 11/105,182, filed Mar. 31, 2017, 35 pages.
Exhibit 3 of the Declaration of Infotrade Media Co., Ltd., Peter Chu, Sports Trader Asia: The Premier Product Guide Spring 2002 (Infotrade Media Co., Ltd. Jan. 2002) (a product catalogue), 16 pages.
Interlock Mats for house floor; http://www.evahwcg.com.tw/b_interlocking_en.htm; Oct. 28, 2016; 3 pages.
Interlocking Dense Foam Mats https://web.archive.org/web/20060311080132/www.greatmats.com/products/dense-foam-mats-exercise.html Aug. 16, 2017, 4 pages.
Memorandum of Points and Authorities in Support of Plaintiff's Notice of Motion and Motion to Strike Final Invalidity Contentions, Doc. 157-1, *Parallax Group* v. *Incstores*, USDC Central District Case No. 8:16-cv-929-AG-DFM, Nov. 6, 2017, 20 pages.

(56) References Cited

OTHER PUBLICATIONS

Online Sporting Catalog, http://www.evahwcg.eom.tw/sporting_photos_en.html; Aug. 23, 2017, 2 pages.
Patent Owner Parallax Group International's brief in opposition to BJ's motion for summary judgment of noninfringement. *Parallax Group Int'!* v. *BJ's Wholesale Club, Inc et al.*, Case No. 2:07-cv-04211, Doc. No. 28-2 (C.D.Cal., Apr. 17, 2008), 29 pages.
Reversible Puzzle Mat, karatesupply.com, <http://www.karatesupply.com/rev_sportmat.htm>, Mar. 2, 2006, 2 pages.
Wang et al., "Sealing Processes of Mgal2O4-to-Glass for Projection Cathode Ray Tubes", Japanese Journal of Applied Physics, vol. 41, Issue 10, 2002, pp. 6110-6111.
Ashbee, Kenneth H.G., Fundamental Principles of Fiber Reinforced Composites, Second Edition, Jul. 3, 1993 by CRC Press, 10 pages.
Advisory Action in Ex Parte Reexamination received for U.S. Appl. No. 90/013,848, mailed on Mar. 8, 2022, 3 pages.
Advisory Action in Ex Parte Reexamination received for U.S. Appl. No. 90/013,849, mailed on Mar. 8, 2022, 3 pages.
Advisory Action received for U.S. Appl. No. 11/105,182, mailed on Aug. 30, 2006, 4 pages.
Advisory Action received for U.S. Appl. No. 14/630,232, mailed on Dec. 14, 2015, 4 pages.
Advisory Action received for U.S. Appl. No. 16/283,618, mailed on Apr. 23, 2021, 11 pages.
Alessco Inc. Catalog, allesco.com. 2002, 8 pages.
All New HOP-A-ROUND, Amazing ALPHAMAT, http://web.archive.org/web/20020109124400/http://www.alessco.com/brochures_kids/brochure_kids_2.html, 2002, 1 page.
Appellant's Opening Brief (corrected); US Court of Appeals for the Federal Circuit in re: Parallax Group International, LC; Case: 2020-2078 (Document 17) filed on Feb. 9, 2021 (61 pages).
Appellant's Reply Brief; US Court of Appeals for the Federal Circuit in re: Parallax Group International, LLC; Case 20-2078 (Document 27) filed on Jun. 10, 2021 (40 pages).
Appellee's Brief; US Court of Appeals for the Federal Circuit in re: Parallax Group International, LLC; Case 20-2078 Document 24) filed on Apr. 19, 2021 (41 pages).
ASTM E831-14, Standard Test Method for Linear Thermal Expansion of Solid Materials by Thermomechanical Analysis, Published Aug. 2014, pp. 1-5.
Attachment A Case 8:16-cv-00929-AG-DFM Document 56-1 Filed Mar. 30, 2017, p. 1 of 51 p. ID #:690 (Civil Action No. 8:16-cv-929-AG-DFM); 51 pages.
Bogdanovich, A., Pastore, C, Mechanics of Textile and Laminated Composites: With Applications to Structural Analysis Springer Science & Business Media, Aug. 31, 1996, 6 pages.
Building A digital library for the future, http://web.archive.Org/web/19970126045828/http://www.archive.org/, 1997, 1 page.
Civil Minutes 114 Case No. SACV 16-00929-AG-DFMx Date Jun. 30, 2017, Title—*The Parallax Group International, LLC* v. *Incstores LLC*; Filed Jun. 30, 2017, Page ID #:3282, 16 pages.
Convention and Trade Show Booth Mats, http://web.archive.org/web/20030408022157/http://www.greatmats.com/tradeshow.html, 2003, 3 pages.
Decision by Court of Appeals for the Federal Circuit in Ex Parte Reexamination received for U.S. Appl. No. 90/013,852, mailed on Sep. 2, 2021, 2 pages.
Decision by Court of Appeals for the Federal Circuit in Ex Parte Reexamination received for U.S. Appl. No. 90/014,126, mailed on Sep. 2, 2021, 2 pages.
Declaration of Chuck Chan in Support of Incstores' Memorandum of Points and Authorities in Opposition to Plaintiff's Motion to Strike, Doc. 165-13, *Parallax Group* v. *Incstores*, USDC Central District Case No. 8:16-cv-929-AG-DFM, Nov. 13, 2017, 5 pages.
Declaration of Jennifer Shih in Support of Plaintiff's Motion for Sanctions, Doc. 154-25, *Parallax Group* v. *Incstores*, USDC Central District Case No. 8:16-cv-929-AG-DFM, Oct. 13, 2017, 12 pages.
Declaration of John Van Loben Sels in Support of Parallax's Motion to Strike, Doc. 157-2, *Parallax Group* v. *Incstores*, USDC Central District Case No. 8:16-cv-929-AG-DFM, Nov. 6, 2017, 3 pages.

Declaration of John Van Loben Sels in Support of Plaintiff's Motion for Reconsideration, Doc. 153-2, *Parallax Group* v. *Incstores*, USDC Central District Case No. 8:16-cv-929-AG-DFM, Oct. 13, 2017, 3 pages.
Declaration of John Van Loben Sels in Support of Plaintiff's Motion for Sanctions, Doc. 154-2, *Parallax Group* v. *Incstores*, USDC Central District Case No. 8:16-cv-929-AG-DFM, Oct. 13, 2017, 8 pages.
Declaration of Kurt Leitinger in Support of Incstores' Memorandum of Points and Authorities in Opposition to Plaintiff's Motion to Strike, Doc. 165-12, *Parallax Group* v. *Incstores*, USDC Central District Case No. 8:16-cv-929-AG-DFM, Nov. 13, 2017, 8 pages.
Declaration of M. Lusich in Support of its Motion for Sanctions, Doc. 168-1, *Parallax Group* v. *Incstores*, USDC Central District Case No. 8:16-cv-929-AG-DFM, Nov. 20, 2017, 3 pages.
Declaration of M. Lusich in Support of Parallax's Reply to Motion for Reconsideration, Doc. 167- 1, *Parallax Group* v. *Incstores*, USDC Central District Case No. 8:16-cv-929-AG-DFM, Nov. 20, 2017, 3 pages.
Declaration of Matthew A. Pequignot in Support of Incstores' Memorandum of Points and Authorities in Opposition to Plaintiff's Motion for Sanctions, Doc. 159-2, *Parallax Group* v. *Incstores*, USDC Central District Case No. 8:16-cv-929-AG-DFM, Nov. 6, 2017, 9 pages.
Declaration of Matthew Lusich in Support of Plaintiff's Motion for Sanctions, Doc. 153- 6, *Parallax Group* v. *Incstores*, USDC Central District Case No. 8:16-cv-929-AG-DFM, Oct. 13, 2017, 2 pages.
Declaration of Matthew Lusich in Support of Plaintiff's Motion for Sanctions, Doc. 154- 24, *Parallax Group* v. *Incstores*, USDC Central District Case No. 8:16-cv-929-AG-DFM, Oct. 13, 2017, 2 pages.
Declaration of Michael G. Sullivan in Support of Incstores. Memorandum of Points and Authorities in Opposition to Plaintiff's Motion for Sanctions, Doc. 159-1, *Parallax Group* v. *Incstores*, USDC Central District Case No. 8:16-cv-929-AG-DFM, Nov. 6, 2017.
Declaration of Sarah L Woodson in Support of Incstores' Memorandum of Points and Authorities in Opposition to Plaintiff's Motion to Strike, Doc. 165-1, *Parallax Group* v. *Incstores*, USDC Central District Case No. 8:16-cv-929-AGDFM, Nov. 13, 2017, 7 pages.
Declaration of Sarah L. Woodson in Support of Incstores' Memorandum of Points and Authorities in Opposition to Plaintiff's Motion for Sanctions, Doc. 159-12, *Parallax Group* v. *Incstores*, USDC Central District Case No. 8:16-v-929-AG-DFM, Nov. 6, 2017, 10 pages.
Dense Foam Mat Colors, http://web.archive.org/web/20030608094616/http://www.greatmats.com/colors.html., 2003, 3 pages.
Deposition of Ben-Chang au, vol. I, *Parallax Group* v. *Incstores*, USDC Central District Case No. 8:16-cv-929-AGDFM, Aug. 22, 2017, 55 pages.
Evahwcg, "Interlock_Mats_for_house_floor", archived at https://web.archive.org/web/20020611014647/http://www.evahwcg.com.tw/binterlocking en.htm, Jun. 11, 2002, retrieved Oct. 28, 2016.
Evahwcg, "Main Products", archived at https://web.archive.org/web/20020611031656/https://web.archive.org/web/20020611031656/, Jun. 11, 2002, retrieved Oct. 28, 2016, 14 pages.
Evahwcg, "Patterns" archived at https://web.arctlive.org/web/20020622233432/http:/www.evahwcg.com.tw/sportingphotos en.htm, Jun. 22, 2002, retrieved Oct. 28, 2016, 2 pages.
Evahwcg, "Sporting Mats", archived at https://web.archive.org/web/20020612233325/http://www.evahwcg.com.tw/c_sporting_en.htm, Jun. 12, 2002, retrieved Oct. 28, 2016, 2 pages.
Evahwcg, Marvel Mat; archived at https//web.archive.org/web/20020621022039/http:/http://www.evahwcg.com.tw/photos.htm, Jun. 21, 2002, retrieved Oct. 28, 2016, 4 pages.
Ex Parte Reexamination Certificate Issued for U.S. Appl. No. 14/630,232 as U.S. Pat. No. 9,289,085 to Bruce A. Thrush under Control No. 90/013,852 & 90/014,126 on Apr. 1, 2022, 2 pages.
Ex Parte Reexamination Certificate Issued for U.S. Appl. No. 15/642,078 as U.S. Pat. No. 10,258,179 to Bruce A. Thrush under Control No. 90/014,723 on Mar. 1, 2022, 2 pages.
Ex Parte Reexamination Certificate Issued for U.S. Appl. No. 29/203,027 as U.S. Pat. No. D. 532,238 to Bruce A. Thrush under Control No. 90/013,849 on Jun. 22, 2022, 2 pages.

(56)                References Cited

OTHER PUBLICATIONS

Ex Parte Reexamination Certificate Issued for U.S. Appl. No. 29/252,076 as U.S. Pat. No. D. 543,764 to Bruce A. Thrush under Control No. 90/013,848 on Jun. 27, 2022, 2 pages.

Examiner's Answer to Appeal Brief received for U.S. Appl. No. 90/014,126, mailed on Feb. 3, 2020, 11 pages.

Examiner's Answer to Appeal Brief received for U.S. Appl. No. 11/105,182, mailed on Aug. 5, 2008, 12 pages.

Examiner's Answer to Appeal Brief received for U.S. Appl. No. 11/105,182, mailed on Jan. 29, 2014, 18 pages.

Exhibit 1 to Complaint Case 8:16-cv-00927, Document 2-1, Filed May 20, 2016, Page ID #:12; 2 pages.

Exhibit 1 to Declaration of Matthew A. Pequignot in Support of Incstores' Memorandum of Points and Authorities in Opposition to Plaintiff's Motion for Sanctions, Doc. 159-3, *Parallax Group* v. *Incstores*, USDC Central District Case No. 8:16-cv-929-AG-DFM, Nov. 6, 2017.

Exhibit 1 to Declaration of Sarah L Woodson in Support of Incstores' Memorandum of Points and Authorities in Opposition to Plaintiff's Motion for Sanctions, Doc. 160, *Parallax Group* v. *Incstores*, USDC Central District Case No. 8:16-cv-929-AG-DFM, Nov. 7, 2017, 3 pages.

Exhibit 1 to Declaration of Sarah L Woodson in Support of Incstores' Memorandum of Points and Authorities in Opposition to Plaintiffs Motion to Strike, Doc. 165-2, *Parallax Group* v. *Incstores*, USDC Central District Case No. 8:16-cv-929-AG-DFM, Nov. 13, 2017, 22 pages.

Exhibit 10 to Declaration of Sarah L Woodson in Support of Incstores' Memorandum of Points and Authorities in Opposition to Plaintiff's Motion for Sanctions, Doc. 160-9, *Parallax Group* v. *Incstores*, USDC Central District Case No. 8:16-cv-929-AG-DFM, Nov. 6, 2017, 2 pages.

Exhibit 10 to Declaration of Sarah L Woodson in Support of Incstores' Memorandum of Points and Authorities in Opposition to Plaintiff's Motion to Strike, Doc. 165-11, *Parallax Group* v. *Incstores*, USDC Central District Case No. 8:16-cv-929-AG-DFM, Nov. 13, 2017, 3 pages.

Exhibit 11 to Declaration of Sarah L Woodson in Support of Incstores' Memorandum of Points and Authorities in Opposition to Plaintiff's Motion for Sanctions, Doc. 160-10, *Parallax Group* v. *Incstores*, USDC Central District Case No. 8:16-cv-929-AG-DFM, Nov. 6, 2017, 5 pages.

Exhibit 11 to Incstores' Statement of Uncontroverted Facts and Conclusions of Law in Support of Its Motion for Summary Judgment; Case 8:16-cv-00929-AG-DFM Document 64-13 Filed Apr. 7, 2017, Page ID #:1525; 15 pages.

Exhibit 12 to Declaration of Sarah L Woodson in Support of Incstores' Memorandum of Points and Authorities in Opposition to Plaintiff's Motion for Sanctions, Doc. 160-11, *Parallax Group* v. *Incstores*, USDC Central District Case No. 8:16-cv-929-AG-DFM, Nov. 6, 2017, 3 pages.

Exhibit 13 to Declaration of Sarah L Woodson in Support of Incstores' Memorandum of Points and Authorities in Opposition to Plaintiff's Motion for Sanctions, Doc. 160-12, *Parallax Group* v. *Incstores*, USDC Central District Case No. 8:16-cv-929-AG-DFM, Nov. 6, 2017, 80 pages.

Exhibit 13, Deposition of Bruce Thrush, Parallax Grp. *Int'l, LLC* v. *Incstores LLC*, No. 8:16-cv-00929-AG-DFM (C.D. Cal. Feb. 22, 2018), ECF No. 219-2, 43 pages.

Exhibit 14 to Declaration of Sarah L Woodson in Support of Incstores' Memorandum of Points and Authorities in Opposition to Plaintiff's Motion for Sanctions, Doc. 160-13, *Parallax Group* v. *Incstores*, USDC Central District Case No. 8:16-cv-929-AG-DFM, Nov. 7, 2017, 7 pages.

Exhibit 14 to Incstores' Statement of Uncontroverted Facts and Conclusions of Law in Support of Its Motion for Summary Judgment; Case 8:16-Cv-00929-Ag-Dfm Document 64-16 Filed Apr. 7, 2017 Page Id #:1556; 16 Pages.

Exhibit 14, Pl.'s Resp.to Def.'s Req. for Admis. No. 129, *Parallax Grp. Int'l, LLC* v. *Incstores LLC*, No. 8:16-cv-00929-AG-DFM (C.D. Cal. Jan. 1, 2018), ECF No. 193-20, 5 pages.

Exhibit 15 to Declaration of Sarah L Woodson in Support of Incstores' Memorandum of Points and Authorities in Opposition to Plaintiff's Motion for Sanctions, Doc. 160-14, *Parallax Group* v. *Incstores*, USDC Central District Case No. 8:16-cv-929-AG-DFM, Nov. 7, 2017, 2 pages.

Exhibit 15, Pl.'s Resp.to Def.'s Req. for Admis. No. 136, *Parallax Grp. Int'l, LLC* v. *Incstores LLC*, No. 8:16-cv-00929-AG-DFM (C.D. Cal. Jan. 20, 2018), ECF No. 193-22, 4 pages.

Exhibit 16 to Declaration of Sarah L Woodson in Support of Incstores' Memorandum of Points and Authorities in Opposition to Plaintiff's Motion for Sanctions, Doc. 160-15, *Parallax Group* v. *Incstores*, USDC Central District Case No. 8:16-cv-929-AG-DFM, Nov. 7, 2017, 2 pages.

Exhibit 16, Pl.'s Resp.to Def.'s Req. for Admis. No. 165-167, *Parallax Grp. Int'l, LLC* v. *Incstores LLC*, No. 8:16-cv-00929-AG-DFM (C.D. Cal. Jan. 20, 2018), ECF No. 193-21, 4 pages.

Exhibit 17 to Declaration of Sarah L Woodson in Support of Incstores' Memorandum of Points and Authorities in Opposition to Plaintiff's Motion for Sanctions, Doc. 160-16, *Parallax Group* v. *Incstores*, USDC Central District Case No. 8:16-cv-929-AG-DFM, Nov. 7, 2017, 22 pages.

Exhibit 17, Parallax's Statement of Genuine Disputed Facts in Supp. of Opp'n to Incstores' Invalidity Summ. J. Mot., *Parallax Grp. Int'l, LLC* v. *Incstores LLC*, No. 8:16-cv-00929-AG-DFM (C.D. Cal. Feb. 6, 2018), ECF No. 202, 6 pages.

Exhibit 18 to Declaration of Sarah L Woodson in Support of Incstores' Memorandum of Points and Authorities in Opposition to Plaintiff's Motion for Sanctions, Doc. 160-17, *Parallax Group* v. *Incstores*, USDC Central District Case No. 8:16-cv-929-AG-DFM, Nov. 7, 2017, 3 pages.

Exhibit 18, Decl. of Bruce Thrush in Supp. of Parallax's Opp'n to Mot. for Summ. J., Parallax Grp. *Int'l, LLC* v. *Incstores LLC*, No. 8:16-cv-00929-AG-DFM (C.D. Cal. Feb. 6, 2018), ECF No. 202-4, 4 pages.

Exhibit 19 to Declaration of Sarah L Woodson in Support of Incstores' Memorandum of Points and Authorities in Opposition to Plaintiff's Motion for Sanctions, Doc. 160-18, *Parallax Group* v. *Incstores*, USDC Central District Case No. 8:16-cv-929-AG-DFM, Nov. 7, 2017, 56 pages.

Exhibit 19 to Incstores' Statement of Uncontroverted Facts and Conclusions of Law in Support of Its Motion for Summary Judgment; Case 8:16-cv-00929-AG-DFM Document 64-21 Filed Apr. 7, 2017, p. 1614; 19 pages.

Exhibit 2 to Complaint Case 8:16-cv-00927, Document 2-2, Filed May 20, 2016, Page ID #:14; 2 pages.

Exhibit 2 to Declaration of Matthew A. Pequignot in Support of Incstores' Memorandum of Points and Authorities in Opposition to Plaintiff's Motion for Sanctions, Doc. 159-4, *Parallax Group* v. *Incstores*, USDC Central District Case No. 8:16-cv-929-AG-DFM, Nov. 6, 2017, 3 pages.

Exhibit 2 to Declaration of Sarah L Woodson in Support of Incstores' Memorandum of Points and Authorities in Opposition to Plaintiff's Motion for Sanctions, Doc. 160-1, *Parallax Group* v. *Incstores*, USDC Central District Case No. 8:16-cv-929-AG-DFM, Nov. 6, 2017, 2 pages.

Exhibit 2 to Declaration of Sarah L Woodson in Support of Incstores' Memorandum of Points and Authorities in Opposition to Plaintiffs Motion to Strike, Doc. 165-3, *Parallax Group* v. *Incstores*, USDC Central District Case No. 8:16-cv-929-AG-DFM, Nov. 13, 2017, 8 pages.

Exhibit 20 to Declaration of Sarah L Woodson in Support of Incstores' Memorandum of Points and Authorities in Opposition to Plaintiff's Motion for Sanctions, Doc. 160-19, *Parallax Group* v. *Incstores*, USDC Central District Case No. 8:16-cv-929-AG-DFM, Nov. 7, 2017, 51 pages.

Exhibit 22 to Incstores' Statement of Uncontroverted Facts and Conclusions of Law in Support of Its Motion for Summary Judgment; Case 8:16-cv-00929-AG-DFM Document 64-24 Filed Apr. 7, 2017, Page ID#:1647; 34 pages.

(56) References Cited

OTHER PUBLICATIONS

Exhibit 24 to Incstores' Statement of Uncontroverted Facts and Conclusions of Law in Support of Its Motion for Summary Judgment; Case 8:16-cv-00929-AG-DFM Document 64-26 Filed Apr. 7, 2017, Page ID #:1686, 13 pages.

Exhibit 25 to Incstores' Statement of Uncontroverted Facts and Conclusions of Law in Support of Its Motion for Summary Judgment; Case 8:16-cv-00929-AG-DFM Document 64-27 Filed Apr. 7, 2017, Page ID #:1698, 11 pages.

Exhibit 3 Complaint Case 8:16-cv-00927, Document 2-3, Filed May 20, 2016, Page ID #:16; 4 pages.

Exhibit 3 to Declaration of Matthew A. Pequignot in Support of Incstores' Memorandum of Points and Authorities in Opposition to Plaintiff's Motion for Sanctions, Doc. 159-5, *Parallax Group v. Incstores*, USDC Central District Case No. 8:16-cv-929-AG-DFM, Nov. 6, 2017, 2 pages.

Exhibit 3 to Declaration of Sarah L Woodson in Support of Incstores' Memorandum of Points and Authorities in Opposition to Plaintiff's Motion for Sanctions, Doc. 160-2, *Parallax Group v. Incstores*, USDC Central District Case No. 8:16-cv-929-AG-DFM, Nov. 6, 2017, 4 pages.

Exhibit 3 to Declaration of Sarah L Woodson in Support of Incstores' Memorandum of Points and Authorities in Opposition to Plaintiffs Motion to Strike, Doc. 165-4, *Parallax Group v. Incstores*, USDC Central District Case No. 8:16-cv-929-AG-DFM, Nov. 13, 2017, 2 pages.

Exhibit 4 to Declaration of Matthew A. Pequignot in Support of Incstores' Memorandum of Points and Authorities in Opposition to Plaintiff's Motion for Sanctions, Doc. 159-6, *Parallax Group v. Incstores*, USDC Central District Case No. 8:16-cv-929-AG-DFM, Nov. 6, 2017, 2 pages.

Exhibit 4 to Declaration of Sarah L Woodson in Support of Incstores' Memorandum of Points and Authorities in Opposition to Plaintiff's Motion for Sanctions, Doc. 160-3, *Parallax Group v. Incstores*, USDC Central District Case No. 8:16-cv-929-AG-DFM, Nov. 6, 2017, 2 pages.

Exhibit 4 to Declaration of Sarah L Woodson in Support of Incstores' Memorandum of Points and Authorities in Opposition to Plaintiffs Motion to Strike, Doc. 165-5, *Parallax Group v. Incstores*, USDC Central District Case No. 8:16-cv-929-AG-DFM, Nov. 13, 2017, 13 pages.

Exhibit 4 to Incstores' Statement of Uncontroverted Facts and Conclusions of Law in Support of Its Motion for Summary Judgment; Case 8:16-cv-00929-AG-DFM Document 64-6 Filed Apr. 7, 2017, Page ID #:1446, 30 pages.

Exhibit 5 to Declaration of Matthew A. Pequignot in Support of Incstores' Memorandum of Points and Authorities in Opposition to Plaintiff's Motion for Sanctions, Doc. 159-7, *Parallax Group v. Incstores*, USDC Central District Case No. 8:16-cv-929-AG-DFM, Nov. 6, 2017, 2 pages.

Exhibit 5 to Declaration of Sarah L Woodson in Support of Incstores' Memorandum of Points and Authorities in Opposition to Plaintiff's Motion for Sanctions, Doc. 160-4, *Parallax Group v. Incstores*, USDC Central District Case No. 8:16-cv-929-AG-DFM, Nov. 6, 2017, 2 pages.

Exhibit 5 to Declaration of Sarah L Woodson in Support of Incstores' Memorandum of Points and Authorities in Opposition to Plaintiffs Motion to Strike, Doc. 165-6, *Parallax Group v. Incstores*, USDC Central District Case No. 8:16-cv-929-AG-DFM, Nov. 13, 2017, 12 pages.

Exhibit 6 to Declaration of Matthew A. Pequignot in Support of Incstores' Memorandum of Points and Authorities in Opposition to Plaintiff's Motion for Sanctions, Doc. 159-8, *Parallax Group v. Incstores*, USDC Central District Case No. 8:16-cv-929-AG-DFM, Nov. 6, 2017, 2 pages.

Exhibit 6 to Declaration of Sarah L Woodson in Support of Incstores' Memorandum of Points and Authorities in Opposition to Plaintiff's Motion for Sanctions, Doc. 160-5, *Parallax Group v. Incstores*, USDC Central District Case No. 8:16-cv-929-AG-DFM, Nov. 6, 2017.

Exhibit 6 to Declaration of Sarah L Woodson in Support of Incstores' Memorandum of Points and Authorities in Opposition to Plaintiffs Motion to Strike, Doc. 165-7, *Parallax Group v. Incstores*, USDC Central District Case No. 8:16-cv-929-AG-DFM, Nov. 13, 2017, 2 pages.

Exhibit 7 to Declaration of Matthew A. Pequignot in Support of Incstores' Memorandum of Points and Authorities in Opposition to Plaintiff's Motion for Sanctions, Doc. 159-9, *Parallax Group v. Incstores*, USDC Central District Case No. 8:16-cv-929-AG-DFM, Nov. 6, 2017, 5 pages.

Exhibit 7 to Declaration of Sarah L Woodson in Support of Incstores' Memorandum of Points and Authorities in Opposition to Plaintiff's Motion for Sanctions, Doc. 160-6, *Parallax Group v. Incstores*, USDC Central District Case No. 8:16-cv-929-AG-DFM, Nov. 6, 2017, 3 pages.

Exhibit 7 to Declaration of Sarah L Woodson in Support of Incstores' Memorandum of Points and Authorities in Opposition to Plaintiff's Motion to Strike, Doc. 165-8, *Parallax Group v. Incstores*, USDC Central District Case No. 8:16-cv-929-AG-DFM, Nov. 13, 2017, 3 pages.

Exhibit 8 to Declaration of Matthew A. Pequignot in Support of Incstores' Memorandum of Points and Authorities in Opposition to Plaintiff's Motion for Sanctions, Doc. 159-10, *Parallax Group v. Incstores*, USDC Central District Case No. 8:16-cv-929-AG-DFM, Nov. 6, 2017, 2 pages.

Exhibit 8 to Declaration of Sarah L Woodson in Support of Incstores' Memorandum of Points and Authorities in Opposition to Plaintiff's Motion for Sanctions, Doc. 160-7, *Parallax Group v. Incstores*, USDC Central District Case No. 8:16-cv-929-AG-DFM, Nov. 6, 2017, 2pages.

Exhibit 8 to Declaration of Sarah L Woodson in Support of Incstores' Memorandum of Points and Authorities in Opposition to Plaintiff's Motion to Strike, Doc. 165-9, *Parallax Group v. Incstores*, USDC Central District Case No. 8:16-cv-929-AG-DFM, Nov. 13, 2017, 2 pages.

Exhibit 8, Vision Puzzle Mats http://www.mykick.com.tw/mats.html; Oct. 24, 2016, 2 pages.

Exhibit 9 to Declaration of Matthew A. Pequignot in Support of Incstores' Memorandum of Points and Authorities in Opposition to Plaintiff's Motion for Sanctions, Doc. 159-11, *Parallax Group v. Incstores*, USDC Central District Case No. 8:16-cv-929-AG-DFM, Nov. 6, 2017, 2 pages.

Exhibit 9 to Declaration of Sarah L Woodson in Support of Incstores' Memorandum of Points and Authorities in Opposition to Plaintiff's Motion for Sanctions, Doc. 160-8, *Parallax Group v. Incstores*, USDC Central District Case No. 8:16-cv-929-AG-DFM, Nov. 6, 2017, 5 pages.

Exhibit 9 to Declaration of Sarah L Woodson in Support of Incstores' Memorandum of Points and Authorities in Opposition to Plaintiff's Motion to Strike, Doc. 165-10, *Parallax Group v. Incstores*, USDC Central District Case No. 8:16-cv-929-AG-DFM, Nov. 13, 2017, 3 pages.

Exhibit A to Declaration of Jennifer Shih in Support of Plaintiff's Motion for Sanctions, Doc. 154-26, *Parallax Group v. Incstores*, USDC Central District Case No. 8:16-cv-929-AG-DFM, Oct. 13, 2017, 2 pages.

Exhibit A to Declaration of John Van Loben Sels in Support of Parallax's Motion to Strike, Doc. 157-3, *Parallax Group v. Incstores*, USDC Central District Case No. 8:16-cv-929-AG-DFM, Nov. 6, 2017, 60 pages.

Exhibit A to Declaration of John Van Loben Sels in Support of Plaintiff's Motion for Sanctions, Doc. 154-18, *Parallax Group v. Incstores*, USDC Central District Case No. 8:16-cv-929-AG-DFM, Oct. 13, 2017.

Exhibit A to Declaration of John Van Loben Sels in Support of Plaintiff's Motion for Sanctions, Doc. 154-3, *Parallax Group v. Incstores*, USDC Central District Case No. 8:16-cv-929-AG-DFM, Oct. 13, 2017, 4 pages.

Exhibit B to Declaration of John Van Loben Sels in Support of Parallax's Motion to Strike, Doc. 157-4, *Parallax Group v. Incstores*, USDC Central District Case No. 8:16-cv-929-AG-DFM, Nov. 6, 2017, 4 pages.

(56)         References Cited

OTHER PUBLICATIONS

Exhibit B to Declaration of John Van Loben Sels in Support of Plaintiff's Motion for Reconsideration, Doc. 153-4, *Parallax Group* v. *Incstores*, USDC Central District Case No. 8:16-cv-929-AG-DFM, Oct. 13, 2017, 6 pages.

Exhibit B to Declaration of John Van Loben Sels in Support of Plaintiff's Motion for Sanctions, Doc. 154-27, *Parallax Group* v. *Incstores*, USDC Central District Case No. 8:16-cv-929-AG-DFM, Oct. 13, 2017, 2 Pages.

Exhibit B to Declaration of John Van Loben Sels in Support of Plaintiff's Motion for Sanctions, Doc. 154-4, *Parallax Group* v. *Incstores*, USDC Central District Case No. 8:16-cv-929-AG-DFM, Oct. 13, 2017, 43 pages.

Exhibit C to Declaration of John Van Loben in Support of Plaintiff's Motion for Sanctions, Doc. 154- 28, *Parallax Group* v. *Incstores*, USDC Central District Case No. 8:16-cv-929-AG-DFM, Oct. 13, 2017, 2 pages.

Exhibit C to Declaration of John Van Loben Sels in Support of Parallax's Motion to Strike, Doc. 157-5, *Parallax Group* v. *Incstores*, USDC Central District Case No. 8:16-cv-929-AG-DFM, Nov. 6, 2017, 72 pages.

Exhibit C to Declaration of John Van Loben Sels in Support of Plaintiff's Motion for Reconsideration, Doc. 153-5, *Parallax Group* v. *Incstores*, USDC Central District Case No. 8:16-cv-929-AG-DFM, Oct. 13, 2017, 29 pages.

Exhibit C to Declaration of John Van Loben Sels in Support of Plaintiff's Motion for Sanctions, Doc. 154-5, *Parallax Group* v. *Incstores*, USDC Central District Case No. 8:16-cv-929-AG-DFM, Oct. 13, 2017, 29 pages.

Exhibit D to Declaration of Jennifer Shih in Support of Plaintiff's Motion for Sanctions, Doc. 154-29, *Parallax Group* v. *Incstores*, USDC Central District Case No. 8:16-cv-929-AG-DFM, Oct. 13, 2017, 2 pages.

Exhibit D to Declaration of John Van Loben Sels in Support of Parallax's Motion to Strike, Doc. 157-6, *Parallax Group* v. *Incstores*, USDC Central District Case No. 8:16-cv-929-AG-DFM, Nov. 6, 2017, 21 pages.

Exhibit D to Declaration of Sarah L Woodson in Support of Plaintiff's Motion for Sanctions, Doc. 154-6, *Parallax Group* v. *Incstores*, USDC Central District Case No. 8:16-cv-929-AG-DFM, Oct. 13, 2017, 92 pages.

Exhibit E to Declaration of Jennifer Shih in Support of Plaintiff's Motion for Sanctions, Doc. 154-30, *Parallax Group* v. *Incstores*, USDC Central District Case No. 8:16-cv-929-AG-DFM, Oct. 13, 2017, 2 pages.

Exhibit E to Declaration of John Van Loben Sels in Support of Plaintiff's Motion for Sanctions, Doc. 154-7, *Parallax Group* v. *Incstores*, USDC Central District Case No. 8:16-cv-929-AG-DFM, Oct. 13, 2017, 19 pages.

Exhibit E to Declaration of Sarah L Woodsun in Support of Parallax's Motion to Strike, Doc.157-7, *Parallax Group* v. *Incstores*, USDC Central District Case No. 8:16-cv-929-AG-DFM, Nov. 6, 2017, 16 pages.

Exhibit F to Declaration of Ben-Chang Ou in Support of Parallax's Motion to Strike, Doc. 157-8, *Parallax Group* v. *Incstores*, USDC Central District Case No. 8:16-cv-929-AG-DFM, Nov. 6, 2017, 43 pages.

Exhibit F to Declaration of John Van Loben Sels in Support of Plaintiff's Motion for Sanctions, Doc. 154-8, *Parallax Group* v. *Incstores*, USDC Central District Case No. 8:16-cv-929-AG-DFM, Oct. 13, 201, 6 pages.

Exhibit G to Declaration of John Van Loben Sels in Support of Parallax's Motion to Strike, Doc. 157-9, *Parallax Group* v. *Incstores*, USDC Central District Case No. 8:16-cv-929-AG-DFM, Nov. 6, 2017, 29 pages.

Exhibit G to Declaration of John Van Loben Sels in Support of Plaintiff's Motion for Sanctions, Doc. 154-9, *Parallax Group* v. *Incstores*, USDC Central District Case No. 8:16-cv-929-AG-DFM, Oct. 13, 2017, 2 pages.

Exhibit H to Declaration of John Van Loben Sels in Support of Parallax's Motion to Strike, Doc. 157-10, *Parallax Group* v. *Incstores*, USDC Central District Case No. 8:16-cv-929-AG-DFM, Nov. 6, 2017, 19 pages.

Exhibit H to Declaration of John Van Loben Sels in Support of Plaintiff's Motion for Sanctions, Doc. 154-10, *Parallax Group* v. *Incstores*, USDC Central District Case No. 8:16-cv-929-AG-DFM, Oct. 13, 2017, 2 pages.

Exhibit I to Declaration of John Van Loben Sels in Support of Parallax's Motion to Strike, Doc. 157-11, *Parallax Group* v. *Incstores*, USDC Central District Case No. 8:16-cv-929-AG-DFM, Nov. 6, 2017, 6 pages.

Exhibit I to Declaration of John Van Loben Sels in Support of Plaintiff's Motion for Sanctions, Doc. 154-11, *Parallax Group* v. *Incstores*, USDC Central District Case No. 8:16-cv-929-AG-DFM, Oct. 13, 2017, 10 pages.

Exhibit J to Declaration of John Van Loben Sels in Support of Parallax's Motion to Strike, Doc. 157-12, *Parallax Group* v. *Incstores*, USDC Central District Case No. 8:16-cv-929-AG-DFM, Nov. 6, 2017, 6 pages.

Exhibit J to Declaration of John Van Loben Sels in Support of Plaintiff's Motion for Sanctions, Doc. 154-12, *Parallax Group* v. *Incstores*, USDC Central District Case No. 8:16-cv-929-AG-DFM, Oct. 13, 2017, 6 pages.

Exhibit K to Declaration of John Van Loben Sels in Support of Parallax's Motion to Strike, Doc. 157-13, *Parallax Group* v. *Incstores*, USDC Central District Case No. 8:16-cv-929-AG-DFM, Nov. 6, 2017, 23 pages.

Exhibit K to Declaration of John Van Loben Sels in Support of Plaintiff's Motion for Sanctions, Doc. 154-13, *Parallax Group* v. *Incstores*, USDC Central District Case No. 8:16-cv-929-AG-DFM, Oct. 13, 2017, 4 pages.

Exhibit L to Declaration of John Van Loben Sels in Support of Parallax's Motion to Strike, Doc. 157-14, *Parallax Group* v. *Incstores*, USDC Central District Case No. 8:16-cv-929-AG-DFM, Nov. 6, 2017, 14 pages.

Exhibit L to Declaration of John Van Loben Sels in Support of Plaintiff's Motion for Sanctions, Doc. 154-14, *Parallax Group* v. *Incstores*, USDC Central District Case No. 8:16-cv-929-AG-DFM, Oct. 13, 2017, 6 pages.

Exhibit M Part 1 to Declaration of John Van Loben Sels in Support of Plaintiff's Motion for Sanctions, Doc. 154-15, *Parallax Group* v. *Incstores*, USDC Central District Case No. 8:16-cv-929-AG-DFM, Oct. 13, 2017, 17 pages.

Exhibit M Part 2 to Declaration of John Van Loben Sels in Support of Plaintiff's Motion for Sanctions, Doc. 154-16, *Parallax Group* v. *Incstores*, USDC Central District Case No. 8:16-cv-929-AG-DFM, Oct. 13, 2017, 32 pages.

Exhibit N to Declaration of John Van Loben Sels in Support of Plaintiff's Motion for Sanctions, Doc. 154-17, *Parallax Group* v. *Incstores*, USDC Central District Case No. 8:16-cv-929-AG-DFM, Oct. 13, 2017, 3 pages.

Exhibit O to Declaration of John Van Loben Sels in Support of Plaintiff's Motion for Sanctions, Doc. 154-18, *Parallax 3roup* v. *Incstores*, USDC Central District Case No. 8:16-cv-929-AG-DFM, Oct. 13, 2017, 3 pages.

Exhibit P to Declaration of John Van Loben Sels in Support of Plaintiff's Motion for Sanctions, Doc. 154-19, *Parallax Group* v. *Incstores*, USDC Central District Case No. 8:16-cv-929-AG-DFM, Oct. 13, 2017, 23 pages.

Exhibit Q to Declaration of John Van Loben Sels in Support of Plaintiff's Motion for Sanctions, Doc. 154-20, *Parallax Group* v. *Incstores*, USDC Central District Case No. 8:16-cv-929-AG-DFM, Oct. 13, 2017, 3 pages.

Exhibit R to Declaration of John Van Loben Sels in Support of Plaintiff's Motion for Sanctions, Doc. 154-21, *Parallax Group* v. *Incstores*, USDC Central District Case No. 8:16-cv-929-AG-DFM, Oct. 13, 2017, 14 pages.

Exhibit S to Declaration of John Van Loben Sels in Support of Plaintiff's Motion for Sanctions, Doc. 154-22, *Parallax Group* v. *Incstores*, USDC Central District Case No. 8:16-cv-929-AG-DFM, Oct. 13, 2017, 2 pages.

(56) References Cited

OTHER PUBLICATIONS

Exhibit T to Declaration of John Van Loben Sels in Support of Plaintiff's Motion for Sanctions, Doc. 154-23, *Parallax Group* v. *Incstores*, USDC Central District Case No. 8:16-cv-929-AG-DFM, Oct. 13, 2017, 2 pages.

Extended European Search Report received for European Patent Application No. 06112436.8, mailed on Mar. 3, 2011, 6 pages.

Fed Circuit Decision, in re Parallax, Sep. 2, 2021, 2 pages.

Final Office Action in Ex Parte Reexamination received for U.S. Appl. No. 90/013,848, mailed on May 27, 2021, 10 pages.

Final Office Action in Ex Parte Reexamination received for U.S. Appl. No. 90/013,849, mailed on May 27, 2021, 10 pages.

Final Office Action in Ex Parte Reexamination received for U.S. Appl. No. 90/013,852, mailed on Apr. 27, 2018, 49 pages.

Final Office Action in Ex Parte Reexamination received for U.S. Appl. No. 90/013,852, mailed on Aug. 7, 2019, 26 pages.

Final Office Action in Ex Parte Reexamination received for U.S. Appl. No. 90/014,126, mailed on Aug. 7, 2019, 26 pages.

Final Office Action received for U.S. Appl. No. 11/105,182, mailed on Feb. 11, 2008, 11 pages.

Final Office Action received for U.S. Appl. No. 11/105,182, mailed on Feb. 20, 2018, 23 pages.

Final Office Action received for U.S. Appl. No. 11/105,182, mailed on Jan. 12, 2012, 12 pages.

Final Office Action received for U.S. Appl. No. 11/105,182, mailed on Jul. 27, 2006, 11 pages.

Final Office Action received for U.S. Appl. No. 11/105,182, mailed on Nov. 15, 2018, 8 pages.

Final Office Action received for U.S. Appl. No. 11/105,182, mailed on Nov. 2, 2006, 12 pages.

Final Office Action received for U.S. Appl. No. 13/189,400, mailed on Oct. 16, 2012, 12 pages.

Final Office Action received for U.S. Appl. No. 14/630,232, mailed on Oct. 21, 2015, 7 pages.

Final Office Action received for U.S. Appl. No. 15/052,788, mailed on Apr. 10, 2018, 11 pages.

Final Office Action received for U.S. Appl. No. 15/642,078, mailed on Apr. 2, 2018, 10 pages.

Final Office Action received for U.S. Appl. No. 15/642,078, mailed on Oct. 30, 2018, 6 pages.

Final Office Action received for U.S. Appl. No. 16/283,618, mailed on Apr. 27, 2020, 5 pages.

Final Office Action received for U.S. Appl. No. 16/283,618, mailed on Feb. 22, 2021, 6 pages.

Final Office Action received for U.S. Appl. No. 16/283,618, mailed on Jun. 29, 2020, 9 pages.

Greatmats basement web page http://www.greatmats.com:80/basement.html Aug. 25, 2017, 2 pages.

Greatmats Children web page http://www.greatmats.com:80.children.html Aug. 25, 2017, 3 pages.

Greatmats karate web pages http:/www.greatmats.com:80/karate.html Aug. 25, 2017, 4 pages.

Greatmats.com, "Exercise Room Floor Mats", archived at https://web.archive.org/web/20030407233508/http://www.greatmats.com/exercise.html, Apr. 7, 2003, retrieved Oct. 24, 2016, 3 pages.

Greatmats.com—Interlocking foam mats, exercise mats, karate; http://www.greatmats.com; copyright 1999-2001, greatmats.com; https://web.archive.org/web/20030407233508/http:/www.greatmats.com/exerci-se.html; Wayback Machine downloaded Oct. 24, 2016, 3 pages.

Home, greatmats.com, http://web.archive.org/web/20030201204427/http://www.greatmats.com/, 2003, 2 pages.

Hornw Chang Industry Corp., Online product catalog, https://web.archive.org/web/20020510084455/http://www.evahwcg.com.tw/sporting_photos_en.html#sm031, Published May 10, 2002, 2 pages.

Hornw Chang Industry Corp; http;//web.archive.org/web/20020611031656/http;//www.evahwcg.com/tw; Wayback Machine downloaded Oct. 28, 2016, 3 pages.

Incstores Contentions. Patent Owner Parallax Group International's infringement assertions against Requester Incstores LLC in *Paral-lax Group Int'l* v. *Incstores LLC*, Case No. 8:16-cv-00929-AGFDFM (C.D.Cal.), specifically detailed infringement contentions served by Parallax on Greatmats by email dated Dec. 6, 2016, 12 pages.

Interlocking Dense Foam Mats 5/8" http://www.greatmats.com/dense-foam-mats-excercise.html Mar. 2, 2006, 3 pages.

Interlocking Rubber Mats 4×4 FT https://web.archive.org/web/20060302235609/www.greatmats.com/products/rubber-mats- interlocking.html, Mar. 2, 2006, Aug. 16, 2017, 3 pages.

Klempner, Handbook of Polymeric Foams and Foam Technology; Hanser Publishers, Munich 1991, 58 pages.

Korane, Kenneth, Machine Design Guideline for Bonding Plastics, Jun. 15, 2000, Incstores Inc 001971-1993, 7 pages.

Lee, S. et al., "Polymeric Foams—Science and Technology", Polymeric Foam Series, 2007, 36 pages.

Incstores' Memorandum of Points and Authorities in Opposition to Plaintiff's Motion for Reconsideration, Doc. 158, *Parallax Group* v. *Incstores*, USDC Central District Case No. 8:16-cv-929-AG-DFM, Nov. 6, 2017, 22 pages.

Incstores' Memorandum of Points and Authorities in Opposition to Plaintiff's Motion for Sanctions, Doc. 159, *Parallax Group* v. *Incstores*, USDC Central District Case No. 8:16-cv-929-AG-DFM, Nov. 6, 2017, 29 pages.

Incstores' Memorandum of Points and Authorities in Opposition to Plaintiff's Motion to Strike, Doc. 165, *Parallax Group* v. *Incstores*, USDC Central District Case No. 8:16-cv-929-AG-DFM, Nov. 13, 2017, 28 pages.

Lynta, Job; Studies on Adhesives for bonding Rubber to Rubber and Rubber to Textiles, Thesis, The Cochin University of Science and Technology, Department of Polymer Science and Rubber technology, Kochi—india, Jan. 1999. IncStores Inc002043-2229, 187 pages.

Mallick, P. K. Composites Engineering Handbook, CRC Press, Mar. 19, 1997, full text available on https://books.google.com/books?id=e1id9bKG100C&printsec=frontcover&source-=gbs_ViewAPI#v=onepage&q&f=false 9 pages.

Martial Arts and Dojo Space Floor Mats, http://web.archive.org/web/20021211060232/http://www.greatmats.com/karate.html, 2002, 4 pages.

Martial Arts Mats Dense Foam https://web.archive.org/web/20060302235622/www.greatmats.com/products/martial-arts-mats-78.html, 2006, 2 pages.

Martial Arts Online Store, https://web.archive.org/web/20021009233422/http://www.maols.com/id106.htm, 2002, 4 pages.

MartialArtsMart.com—Mats-Reversible Puzzle Mats—2 Color Combo http://www.martialartsmart.net/revpuzmat2.com.html Mar. 2, 2006, 2 pages.

Melaragno, Preliminary Design of Bridges for Architects and Engineers Melaragno Published by CRC Press, 1998, 4 pages.

Memorandum of Points and Authorities in Support of Plaintiff's Notice of Motion and Motion for Sanctions, Doc. 154-1, *Parallax Group* v. *Incstores*, USDC Central District Case No. 8:16-cv-929-AG-DFM, Oct. 13, 2017, 31 pages.

Mykick.com, "Vision Puzzle Mats", archived at https://web.archive.org/web/20021209233056/http://mykick.com/mats.htm, Wayback Machine, Dec. 9, 2002, retrieved Oct. 24, 2016.

Non-Final Office Action in Ex Parte Reexamination received for U.S. Appl. No. 90/013,848, mailed on Mar. 26, 2020, 11 pages.

Non-Final Office Action in Ex Parte Reexamination received for U.S. Appl. No. 90/013,849, mailed on Mar. 26, 2020, 11 pages.

Non-Final Office Action in Ex Parte Reexamination received for U.S. Appl. No. 90/013,852, mailed on Aug. 29, 2017, 34 pages.

Non-Final Office Action in Ex Parte Reexamination received for U.S. Appl. No. 90/013,852, mailed on Jan. 12, 2018, 38 pages.

Non-Final Office Action in Ex Parte Reexamination received for U.S. Appl. No. 90/013,852, mailed on Mar. 18, 2019, 49 pages.

Non-Final Office Action in Ex Parte Reexamination received for U.S. Appl. No. 90/014,126, mailed on Mar. 18, 2019, 49 pages.

Non-Final Office Action in Ex Parte Reexamination received for U.S. Appl. No. 90/014,723, mailed on Oct. 20, 2021, 18 pages.

Non-Final Office Action received for U.S. Appl. No. 11/105,182, mailed on Feb. 26, 2013, 14 pages.

Non-Final Office Action received for U.S. Appl. No. 11/105,182, mailed on Jul. 17, 2012, 15 pages.

(56)            References Cited

OTHER PUBLICATIONS

Non-Final Office Action received for U.S. Appl. No. 11/105,182, mailed on Jun. 23, 2017, 18 pages.
Non-Final Office Action received for U.S. Appl. No. 11/105,182, mailed on May 17, 2006, 8 pages.
Non-Final Office Action received for U.S. Appl. No. 11/105,182, mailed on May 17, 2007, 11 pages.
Non-Final Office Action received for U.S. Appl. No. 11/105,182, mailed on Oct. 24, 2018, 10 pages.
Non-Final Office Action received for U.S. Appl. No. 11/105,182, mailed on Sep. 1, 2011, 10 pages.
Non-Final Office Action received for U.S. Appl. No. 11/105,182, mailed on Sep. 18, 2007, 10 pages.
Non-Final Office Action received for U.S. Appl. No. 13/189,400, mailed on Mar. 1, 2012, 9 pages.
Non-Final Office Action received for U.S. Appl. No. 14/630,232, mailed on Jul. 14, 2015, 8 pages.
Non-Final Office Action received for U.S. Appl. No. 15/052,788, mailed on Nov. 7, 2016, 8 pages.
Non-Final Office Action received for U.S. Appl. No. 15/052,788, mailed on Oct. 11, 2018, 5 pages.
Non-Final Office Action received for U.S. Appl. No. 15/052,788, mailed on Sep. 6, 2017, 13 pages.
Non-Final Office Action received for U.S. Appl. No. 15/642,078, mailed on Sep. 11, 2018, 5 pages.
Non-Final Office Action received for U.S. Appl. No. 15/642,078, mailed on Sep. 6, 2017, 12 pages.
Non-Final Office Action received for U.S. Appl. No. 16/283,618, mailed on Feb. 1, 2021, 6 pages.
Non-Final Office Action received for U.S. Appl. No. 16/283,618, mailed on Jan. 21, 2020, 11 pages.
Non-Final Office Action received for U.S. Appl. No. 16/283,618, mailed on May 17, 2021, 9 pages.
Non-Final Office Action received for U.S. Appl. No. 17/526,891, mailed on May 11, 2023, 15 pages.
Norsk Reversible Foam Floor Mats; http://www.norsk-stor.com/foam-mats-reversible.html, Aug. 15, 2017, 4 pages.
Notice of Allowance issued for U.S. Appl. No. 11/105,182, mailed on Feb. 1, 2019, 8 pages.
Notice of Allowance issued for U.S. Appl. No. 11/105,182, mailed on Jun. 12, 2019, 8 pages.
Notice of Allowance issued for U.S. Appl. No. 14/630,232, mailed on Jan. 21, 2016, 11 pages.
Notice of Allowance issued for U.S. Appl. No. 15/052,788, mailed on May 26, 2017, 9 pages.
Notice of Allowance issued for U.S. Appl. No. 15/052,788, mailed on Nov. 15, 2018, 8 pages.
Notice of Allowance issued for U.S. Appl. No. 15/642,078, mailed on Nov. 28, 2012, 7 pages.
Notice of Allowance issued for U.S. Appl. No. 29/203,027, mailed on Jun. 30, 2006, 10 pages.
Notice of Allowance issued for U.S. Appl. No. 29/252,076, mailed on Aug. 23, 2006, 10 pages.
Notice of Allowance issued for U.S. Appl. No. 29/252,076, mailed on Mar. 30, 2007, 4 pages.
Notice of Intent to Issue a Reexam Certificate received for U.S. Appl. No. 90/013,848, mailed on Jun. 1, 2022, 5 pages.
Notice of Intent to Issue a Reexam Certificate received for U.S. Appl. No. 90/013,849, mailed on Jun. 1, 2022, 5 pages.
Notice of Intent to Issue a Reexam Certificate received for U.S. Appl. No. 90/013,852, mailed on Mar. 3, 2022, 5 pages.
Notice of Intent to Issue a Reexam Certificate received for U.S. Appl. No. 90/014,126, mailed on Mar. 3, 2022, 5 pages.
Notice of Intent to Issue a Reexam Certificate received for U.S. Appl. No. 90/014,723, mailed on Feb. 8, 2022, 3 pages.
Order Denying Motion for Sanctions, Request for Reconsideration, and Motion to Strike, Doc. 172, *Parallax Group v. Incstores*, USDC Central District Case No. 8:16-cv-929-AG-DFM, Dec. 7, 2017, 4 pages.

Order Granting Request for Ex Parte Reexamination received for U.S. Appl. No. 90/013,848, mailed on Jan. 19, 2017, 6 pages.
Order Granting Request for Ex Parte Reexamination received for U.S. Appl. No. 90/013,849, mailed on Jan. 19, 2017, 7 pages.
Order Granting Request for Ex Parte Reexamination received for U.S. Appl. No. 90/013,852, mailed on Feb. 3, 2017, 14 pages.
Order Granting Request for Ex Parte Reexamination received for U.S. Appl. No. 90/014,126, mailed on Jun. 29, 2018, 10 pages.
Order Granting Request for Ex Parte Reexamination received for U.S. Appl. No. 90/014,723, mailed on Apr. 30, 2021, 11 pages.
*Parallax Group International, LLC*, v. *BJ's Wholesale Club, Inc., Venture Products, LLC.* Case No. CV0?-4211 SJO (Ex) Plaintiff Parallax Group International LLC's Memorandum of Points and Authorities in Support of Its Opposition to Defendants BJ's Wholesale Club, Inc. and Venture Products LLC's Joint Motion for Summary Judgment; Document 28-2 Filed Apr. 17, 2008, Page ID #:229, 29 pages.
Parallax's Notice of Motion and Motion for Sanctions, Doc. 154, *Parallax Group* v. *Incstores*, USDC Central District Case No. 8:16-cv-929-AG-DFM, Oct. 13, 2017.
Parallax's Reply in Support of its Motion for Sanctions, Doc. 168, *Parallax Group* v. *Incstores*, USDC Central District Case No. 8:16-cv-929-AG-DFM, Nov. 20, 2017, 16 pages.
Parallax's Reply in Support of its Motion to Strike, Doc. 166, *Parallax Group* v. *Incstores*, USDC Central District Case No. 8:16-cv-929-AG-DFM, Nov. 20, 2017, 14 pages.
Parallax's Reply to Motion for Reconsideration, Doc. 167, *Parallax Group* v. *Incstores*, USDC Central District Case No. 8:16-cv-929-AG-DFM, Nov. 20, 2017, 9 pages.
Park, Dr. Chung Poo, "Polyolefin Foam," Chapter 9 in Handbook of Polymeric Foams and Foam Technology, eds. Daniel Klempner and Kurt C. Frisch (Hanser Publishers, New York, 1991), 58 pages.
Patent Board Decision on Appeal in Ex Parte Reexamination received for U.S. Appl. No. 90/013,852, mailed on May 26, 2020, 14 pages.
Patent Board Decision on Appeal in Ex Parte Reexamination received for U.S. Appl. No. 90/014,126, mailed on May 26, 2020, 14 pages.
Patent Board Decision received for U.S. Appl. No. 11/105,182, mailed on Mar. 31, 2017, 34 pages.
Patent Board Decision received for U.S. Appl. No. 11/105,182, mailed on May 23, 2011, 16 pages.
Patent Product ReversibleMats; http://web.archive.org/web/20040909150634/http://www.evahwcg.eom.tw:80/sm-232_illustration_en.htm; Apr. 24, 2017; 7 pages.
Patrick J. Courtney, Guidelines for Bonding Plastics, Machine Design, Jun. 15, 2000 (a magazine article) (referred to as "Bonding Plastics"), 7 pages.
Pecht et al., Electronic Packaging Materials and Their Properties Article in IEEE Electrical Insulation Magazine, Oct. 2001, 5 pages.
Plaintiff's Memorandum of Points and Authorities in Support of Its Motion for Reconsideration, Doc. 153-1, *Parallax Group v. Incstores*, USDC Central District Case No. 8:16-cv-929-AG-DFM, Oct. 13, 2017, 15 pages.
Plaintiff's Notice of Motion and Motion for Reconsideration, Doc. 153, *Parallax Group* v. *Incstores*, USDC Central District Case No. 8:16-cv-929-AG-DFM, Oct. 13, 2017, 3 pages.
Plaintiff's Notice of Motion and Motion to Strike Final Invalidity Contentions, Doc. 157, *Parallax Group* v. *Incstores*, USDC Central District Case No. 8:16-cv-929-AG-DFM, Nov. 6, 2017, 3 pages.
Printed Mat http://web.archive.org/web/20031207101512http://web.archive.org/web/20031207101512/http://www.chayau.com:80/printedmat.htm Jul. 31, 2017, 3 pages.
Products Cha Yau Products Page, Ca Yau at glance http://web.archive.org/web/20031207103500http://www.chayau.com:80/products.htm Jul. 31, 2017, 2 pages.
Proposed Order Granting Parallax's Motion to Strike, Doc. 157-15, *Parallax Group* v. *Incstores*, USDC Central District Case No. 8:16-cv-929-AG-DFM, Nov. 6, 2017, 2 pages.
Proposed Order Granting Parallax's Sanctions Motion, Doc. 154-31, *Parallax Group* v. *Incstores*, USDC Central District Case No. 8:16-cv-929-AG-DFM, Oct. 13, 2017, 2 pages.

(56) References Cited

OTHER PUBLICATIONS

Proposed Order Granting Plaintiff's Motion for Reconsideration, Doc. 153-7, *Parallax Group* v. *Incstores*, USDC Central District Case No. 8:16-cv-929-AG-DFM, Oct. 13, 2017, 2 pages.
Puzzle Mats form Challenger Martial Arts www.challengermartialarts.com/rubbermats.htm Mar. 2, 2006, Intershop Network Inc. 2001-2003, 3 pages.
Puzzle Sport Mat https://web.archive.org/web/20051225150506/www.karatesupply.com/puzzle_mat.htm, 2005, retrieved on Aug. 16, 2017, 2 pages.
Puzzle Sport Mat MyCentruyGYm.com—Home and Gym and Fitness Equipment http://www.mycenturygym.com/page.cfm/6,0,0,0,0164,0,0,0.html Mar. 2, 2006, 2 pages.
Report on the Filing or Determination of an Action Regarding a Patent or a Trademark; Case 8:16.about.cv.about.00927.about.CJC.about.DFM Document 3, Filed May 20, 2016, Page ID #:20, 1 page.
Report on the Filing or Determination of an Action Regarding a Patent or a Trademark; Case 8:16.about.cv.about.00929.about.AG.about.DFM Document 3, Filed May 20, 2016, Page ID #:18, 1 page.
Report on the Filing or Determination of an Action Regarding a Patent or a Trademark; Case 8:16.about.cv.about.01808.about.RSVVL.about.JC Document 22, Filed Jan. 23, 2017, Page ID #:66, 1 page.
Report on the Filing or Determination of an Action Regarding a Patent or a Trademark; Case 8:16.about.cv.about.01808.about.RSVVL.about.JC Document 4, Filed Sep. 28, 2016, Page ID #:23, 1 page.
Reporter's Transcript of Proceedings, *Parallax Group* v. *Incstores*, USDC Central District Case No. 8:16-cv-929-AGDFM, Dec. 4, 2017, 28 pages.
Request for Reexamination for U.S. Pat. No. D. 532,238 under Control No. 90/013,849, dated Oct. 28, 2016, 13 pages.
Request for Reexamination for U.S. Pat. No. D. 543,764 under Control No. 90/013,848, dated Oct. 28, 2016, 9 pages.
Request for Reexamination for U.S. Pat. No. 10,258,179 under Control No. 90/014,723, dated Apr. 9, 2021, 57 pages.
Request for Reexamination for U.S. Pat. No. 9,289,085 under Control No. 90/013,852, dated Oct. 28, 2016, 1 page.
Request for Reexamination for U.S. Pat. No. 9,289,085 under Control No. 90/014,126, dated May 24, 2018, 53 pages.
Resilite's New Puzzle Mat, Marshall Arts, Preschool Mats, Aerobic Mats & Cheerleading http://web.archive.org/web/20010805175819/http://resilite.com :80/puzzlemat.htm Jul. 27, 2017, 3 pages.
Resilite's Puzzle Mat http://web.archive.org/web/20031231231162558/http://resilite.com:80/puzl.- htm Jul. 27, 2017, 3 pages.
Reversible Puzzle Mat https://web.archive.org/web/20051216010353/www.karatesupply.com/rev_sportmat.htm Mar. 2, 2006, Aug. 16, 2017, 2 pages.
Reversible Puzzle Mats http:www.mykaratestore.com/store/pages-productinfo-category-30- product-92- /training-equipment-tiger-cla . . . Mar. 2, 2006, 2 pages.
Reversible Puzzle Sport Mat MyCentruyGYm.com—Home and Gym and Fitness Equipment http://www.mycenturygym.com/page.cfm/6,0,0,0,0165,0,0,0.html Mar. 2, 2006, 1 page.

Rubber Floor Mats from Challenger Martial Arts https://web.archive.org/web/20040806023152/http://www.challengermartialar-ts.com:80/rubbermats.htm Aug. 16, 2017, 2 pages.
Sammells, Nonporous Inorganic Membranes: for Chemical Processing Copyright .COPYRGT. 2006 Wiley-VCH Verlag Gmbh & Co. KGaA, 13 pages.
Solid Color Economy Mats http:www.mykaratestore.com/store/pages-productinfo-category-30- product-93/training-equimpment-tiger-claw-solid-coior-economy-mats.html Mar. 2, 2006, 1 page.
Solid-state Ionic Devices III: Proceedings of the International Symposium, vol. 3 E. D. Wachsman The Electrochemical Society, 2003—Ionic crystals., 11 pages.
Sporder, http://web.archive.org/web/20030213110814/http://www.greatmats.com/sporder.html, 2003, 2 pages.
Sports Mats, Products utilized for gymnastics, karate, Judo, Yoga and dance fields http://web.archive.org/web/20020223065938/www.evahwcg.com.tw/c_sporting_e-n.htm Sep. 7, 2016, 2 pages.
Sports Trader the Premier Product Buyer Guide Asia, Spring 2002, Fast Forward Sourcing by Infotrade http://www.eveglory.com INC0000109-110 (InfotradeMedia Co., Ltd, 2002) (a product catalogue), 2 pages.
Structural Adhesive in Engineering, Fifth International Conference, Bristol, UK Apr. 1-3, 1998, First Announcement and Call for Papers, Incstores Inc 002005-2042, 38 pages.
T. Perham, Joining of Silicon Carbide Using Interlayer with Matching Coefficient of Thermal Expansion; Materials Science Division, Nov. 1996, Ems Orlando Lawrence Berkley National Laboratory, 128 pages.
The original SoftFLOORS, https://web.archive.org/web/20030212033759/http://www.alessco.com/brochures_exhibit/broch ure_2.html, 2003, 1 page.
The Parallax Group International, LLC, a *California corporation*, v. *Greatmats.com Corporation*, a Wisconsin corporation; Complaint for Patent Infringement Civil Action No. 8:16-cv-927 Document 2, Filed May 20, 2016, Page ID #:4; 8 pages.
The Parallax Group International, LLC, a California Limited Liability Company, Incstores LLC, an Arizona Limited Liability Company, Defendant Incstores' Statement of Uncontroverted Facts and Conclusions of Law in Support of Its Motion for Summary Judgment Case 8:16-cv-00929-AG-DFM Document 64-2 Filed Apr. 7, 2017, Page ID #:1377, 51 pages.
Training Equipment, myKarateStore, retrieved via WayBack Machine Aug. 16, 2017, http://web.archive.org/web/20040901053511/http://mykaratestore.com:- 80, 1 page.
Trendy Sport Mats Inc, Catalog 2002, Trendy Toys & Sporting Goods GMbH, Roth-Eckermuhlen. 12 Pages.
Uher C., Thermal Conductivity 25/Thermal Expansion 13; Mar. 31, 2000, by CRC Press, 6 pages.
Xue, Junqi; Bonding, Adhesion test of rubber and plastic microporous foam sole material, Shanxi Province Xin Jiang Country Rubber New Technology Development Center; 1989, Liu, 5 pages.
Zebramats, https://web.archive.org/web/20030203092609/http://www.zebramats.com/, 2002, 1 page.

* cited by examiner

MAT AND METHOD FOR MANUFACTURING THE SAME

This application is a divisional of U.S. patent application Ser. No. 17/891,806 filed Aug. 19, 2022 entitled "MAT AND METHOD FOR MANUFACTURING THE SAME," which will issue on Jun. 18, 2024 as U.S. Pat. No. 12,011,910, and which claims priority to Taiwanese application No. 110134672 filed on Sep. 16, 2021. These and all other references extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is mats and methods for manufacturing the same.

BACKGROUND

The following description includes information that may be useful in understanding the present invention. It is not an admission that any of the information provided herein is prior art or relevant to the presently claimed invention, or that any publication specifically or implicitly referenced is prior art.

Conventional mats, such as yoga mats, game mats, and anti-slip mats, may be made from different materials and provided with different degrees of foaming for respective functional requirements. To increase a thickness of the mat or meet other requirements, the mat may include layers adhered by an adhesive. For instance, the mat may include a foam layer and an anti-slip layer adhered to a side of the foam layer so that a surface of the mat can provide anti-slip effect.

However, the adhesive may have odor which results in a poor user experience, and the mat often has a complicated manufacturing process that is high cost. In addition, the bonding strength between two adjacent layers may be insufficient due to property differences between the layers and the adhesive, and the hardness, compression rate, and other performance attributes of the mat may be locally influenced due to the adhesive.

The present invention is, therefore, arisen to obviate or at least mitigate the above-mentioned disadvantages. Thus, there is still a need for an improved mat and a method of manufacturing the same.

SUMMARY OF THE INVENTION

The inventive subject matter provides apparatus, systems and methods in which a mat includes multiple foam layers with different hardnesses and porosities connected without adhesive.

The main object of the present invention is to provide a mat and a method for manufacturing the same, which is odorless, multifunctional and easy to manufacture.

To achieve the above and other objects, the present invention provides a mat, including: a first foam layer, a second foam layer and a third foam layer. The first foam layer has a first hardness and a first porosity. The second foam layer is connected with a side of the first foam layer and has a second hardness and a second porosity larger than the first porosity. The third foam layer is connected with a side of the second foam layer opposite to the first foam layer and has a third hardness larger than both the first hardness and the second hardness and a third porosity smaller than the first porosity. The second foam layer includes a first connecting surface facing the first foam layer and a second connecting surface facing the third foam layer, and a size of the contact area between the first connecting surface and the first foam layer is different from a size of the contact area between the second connecting surface and the third foam layer.

To achieve the above and other objects, the present invention further provides a method for manufacturing the mat as described above, including following steps of: preparing the first foam layer, the second foam layer, and the third foam layer, respectively, by foaming; connecting the second foam layer with one of the first foam layer and the third foam layer by thermo-compression; connecting the second foam layer with the other of the first foam layer and the third foam layer by thermo-compression to form a substrate; and cutting the substrate to form at least one mat.

Various objects, features, aspects and advantages of the inventive subject matter will become more apparent from the following detailed description of preferred embodiments, along with the accompanying drawing figures in which like numerals represent like components.

DETAILED DESCRIPTION

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Figure 1:
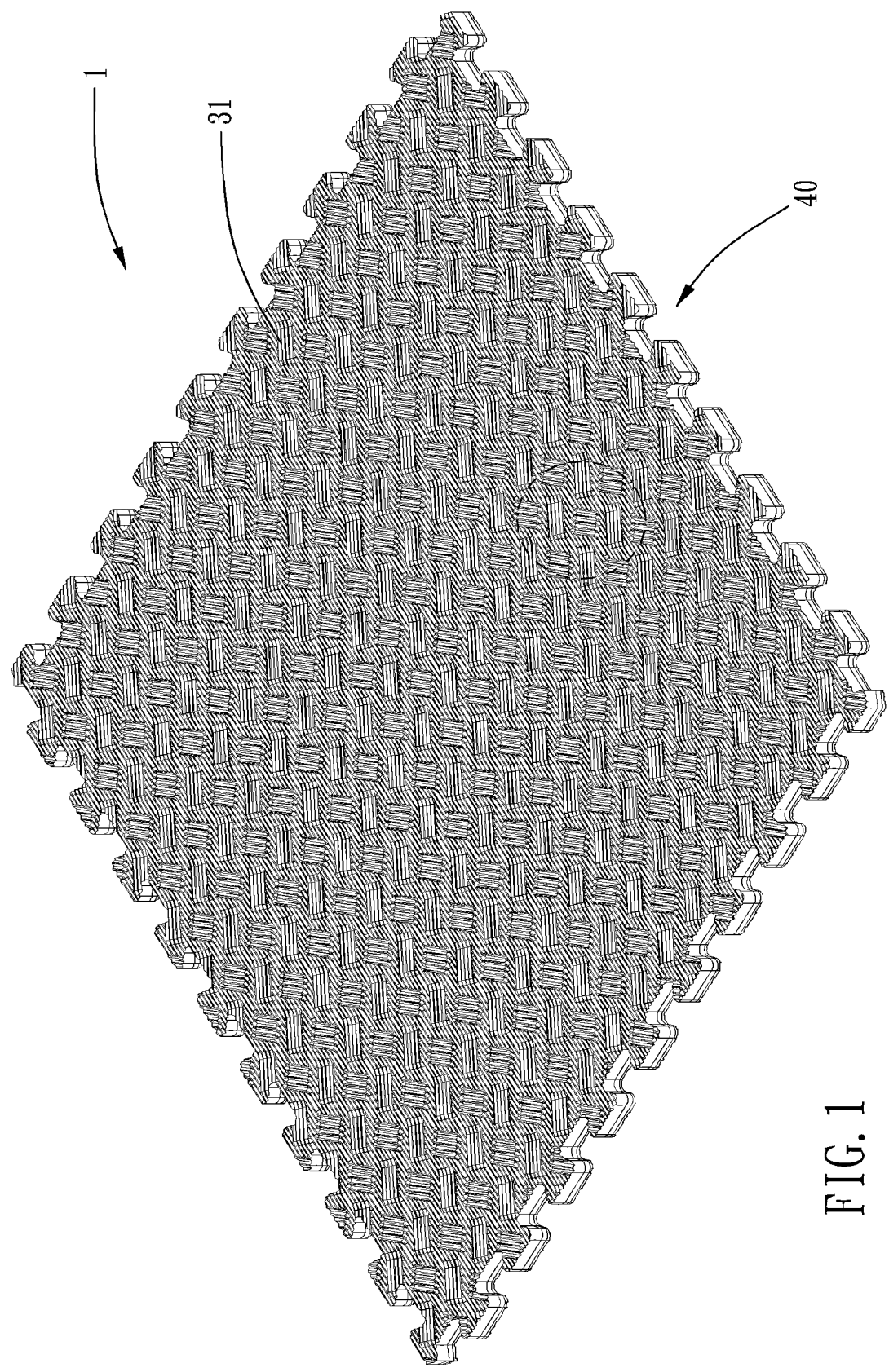
FIG. 1 is a perspective view of one embodiment of a mat.
Figure 2:
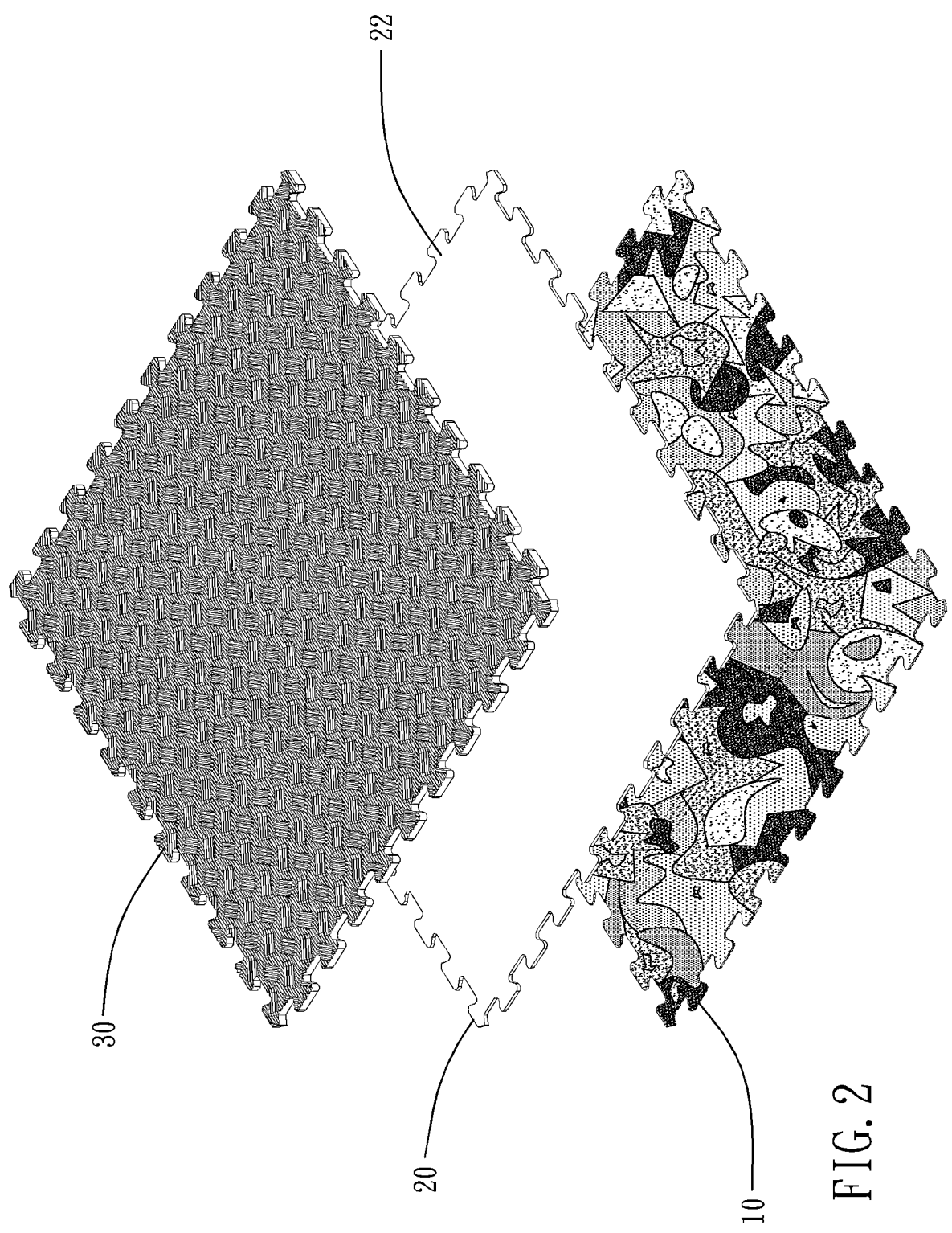
FIG. 2 is an exploded view of another embodiment of a mat.
Figure 3:
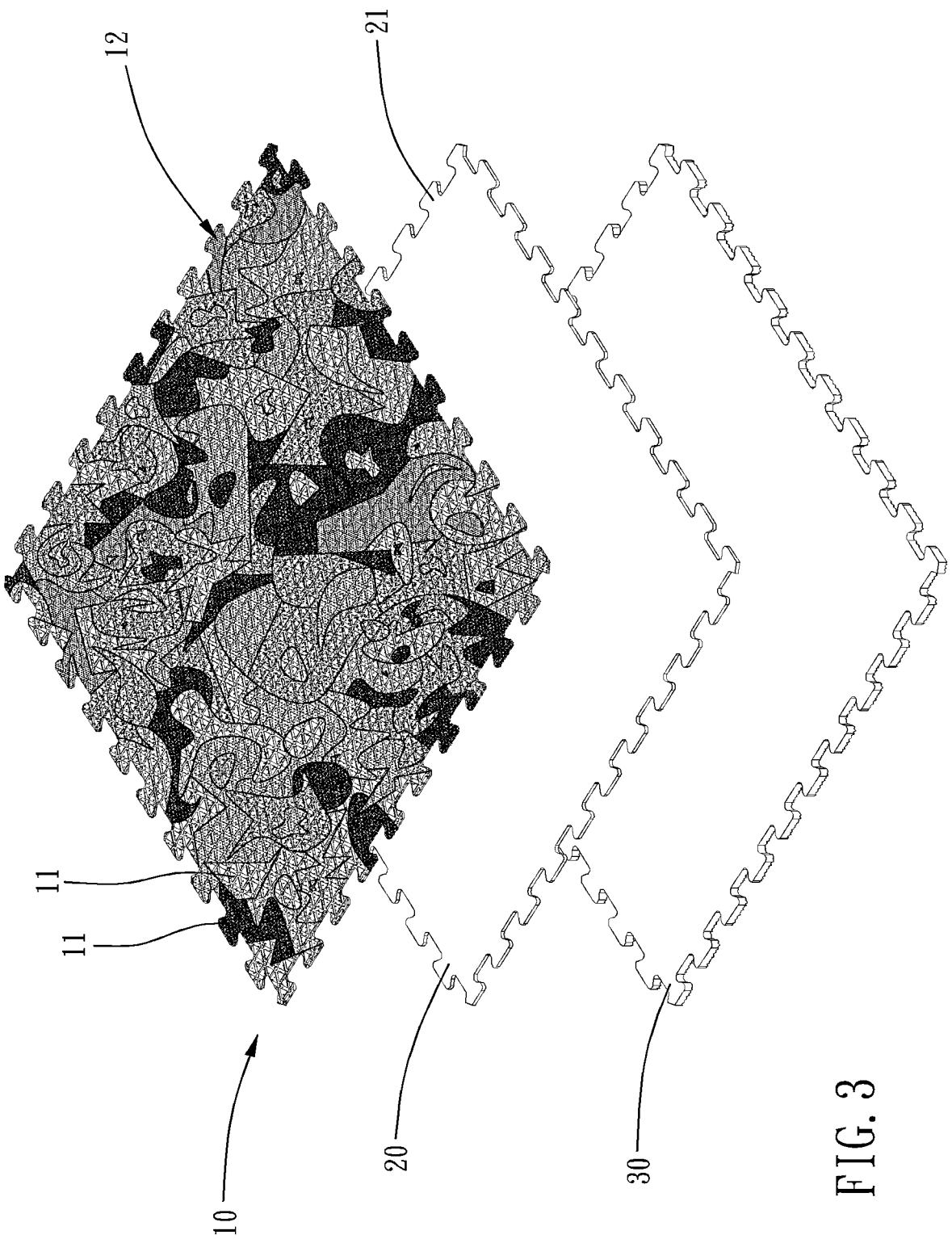
FIG. 3 is an exploded view of another embodiment of a mat.
Figure 4:
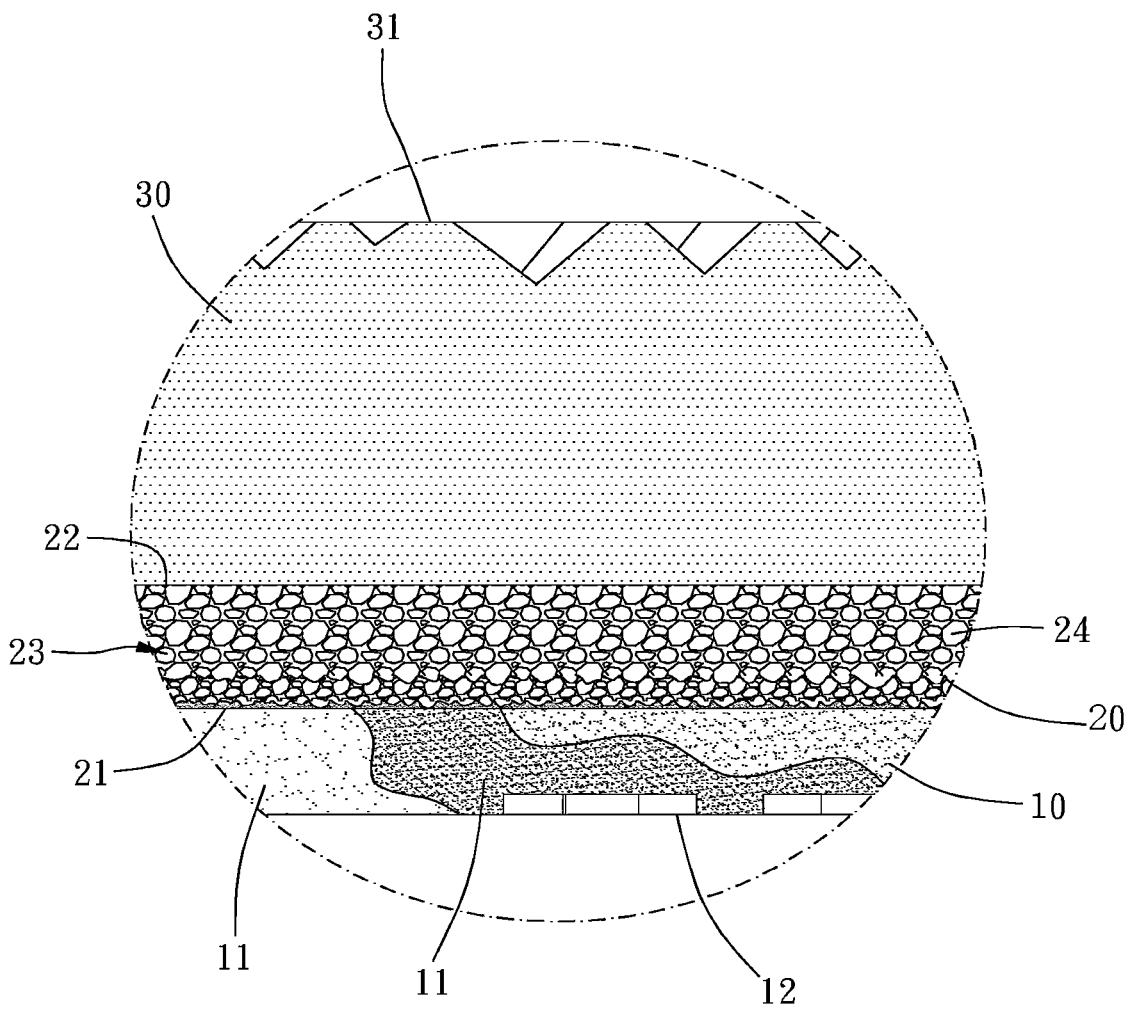
FIG. 4 is a partial enlargement of another embodiment of a mat.

FIG. 1 shows a perspective view of a mat 1 having a contact surface 31 and a structure 40. FIG. 2 shows an exploded top perspective view of mat 1. FIG. 3 shows an exploded bottom perspective view of mat 1. Structure 40 consists of a first foam layer 10, a second foam layer 20 and a third foam layer 30. The second foam layer 20 has a first connecting surface 21 that couples with the first foam layer 10 (see FIG. 3), and a second connecting surface 22 that couples with the third foam layer 30 (see FIG. 2). FIG. 4 shows an enlarged side view of mat 1.

The first foam layer 10 has a first hardness and a first porosity. The second foam layer 20 is connected with a side of the first foam layer 10 and has a second hardness and a second porosity. The second porosity is larger than the first porosity such that the second hardness is less than the first hardness. The third foam layer 30 is connected with a side of the second foam layer 20 opposite to the first foam layer 10 and has a third hardness larger than both the first hardness and the second hardness, and a third porosity smaller than the first porosity. The second foam layer 20 includes a first connecting surface 21 facing the first foam layer 10 and a second connecting surface 22 facing the third foam layer 30, and a size of the contact area between the first connecting surface 21 and the first foam layer 10 is different from a size of the contact area between the second connecting surface 22 and the third foam layer 30. The contact areas of first connecting surface 21 and second connecting surface 22 are different because layer 30 is harder than layer 10.

The first foam layer 10 and the third foam layer 30 are selectable according to use requirements, and the second foam layer 20 provides good cushioning and shock absorption effects. Specifically, the first hardness, the second hardness and the third hardness refer to the average hardness of the first foam layer 10, the second foam layer 20 and the third foam layer 30, respectively. In one embodiment, as measured by a C type hardness tester, a value of the first hardness is within a range from 20 to 35, a value of the second hardness is within a range from 20 to 35, and a value of the third hardness is larger than 40. The C type hardness tester may be a SRIS C type hardness tester (TECLOCK, model number: GS-701N) which is mainly configured to measure an object, such as sponge, soft rubber, or other foaming bodies having a value of hardness less than SRIS A type 20. The greater the value obtained by the hardness tester, the greater the hardness of the object.

In another embodiment, the value of the first hardness is about 30, which is obtained by measuring a surface of the first foam layer 10 opposite to the second foam layer 20. The first foam layer 10 is soft and easy to be deformed, which can be used as a yoga mat for good tactility and cushioning effect. The value of the third hardness is about 50 which is obtained by measuring a surface of the third foam layer 30 opposite to the second foam layer 20. The third foam layer 30 is not easy to be deformed, which can be used to place heavy objects (such as exercise equipment, machines, or the like) for shock absorption effect and supporting stability. The value of the second hardness is about 20 which is obtained by measuring a surface of the second foam layer 20 exposed outward on a section of the mat 1. Moreover, the second foam layer 20 further includes a middle portion 23 located between the first connecting surface 21 and the second connecting surface 22, and at least one of the first connecting surface 21 and the second connecting surface 22 has a hardness larger than a hardness of the middle portion 23 so as to be tightly connected with at least one of the first foam layer 10 and the third foam layer 30.

Figure 6:
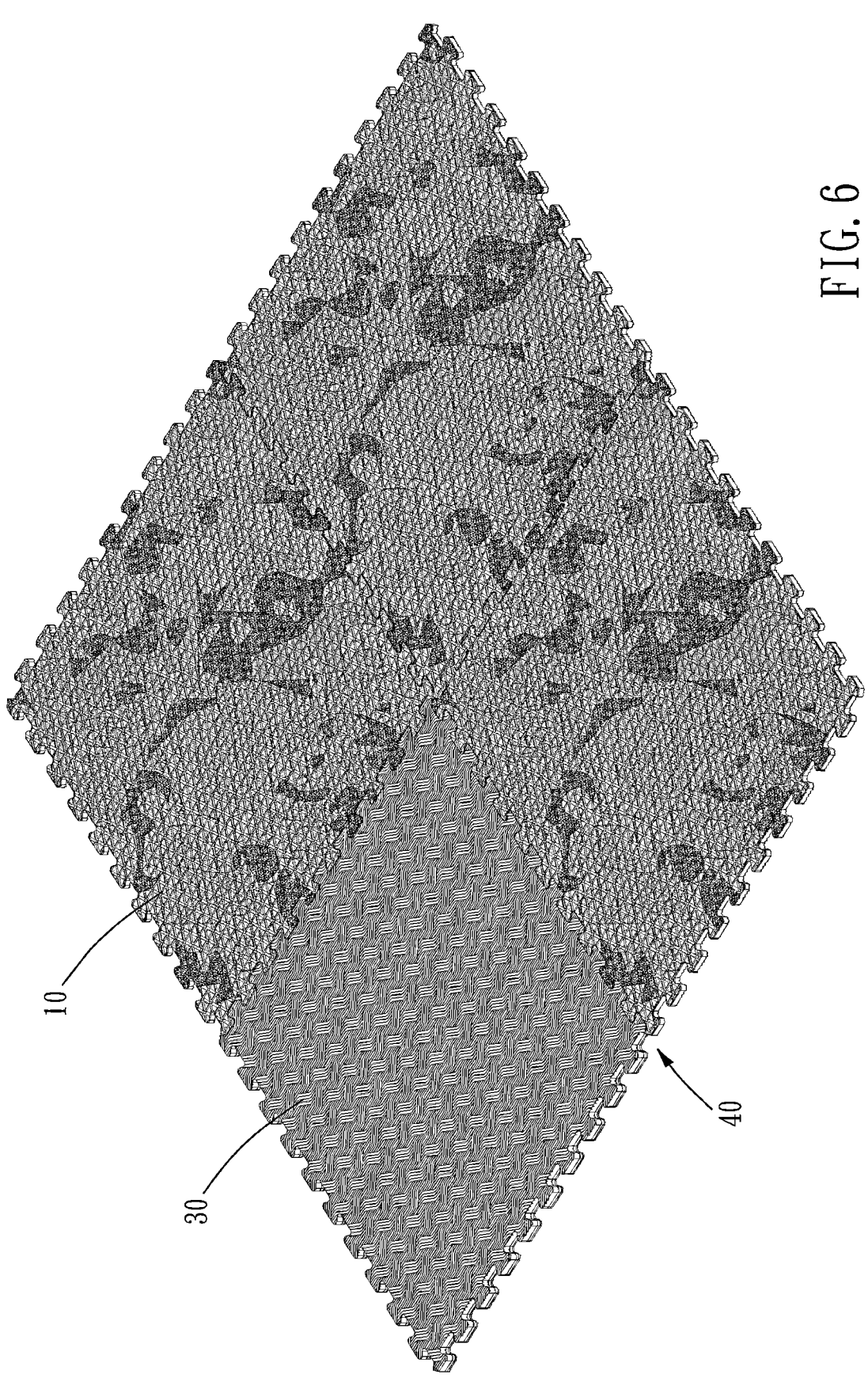
FIG. 6 is perspective view of several interlocking mats.

FIG. 6 shows the mat 1 having an interlocking assembling structure 40 circumferentially disposed thereon, which allows a plurality of said mats 1 to be assembled and interlocked with one another and applied to different use areas. The plurality of said mats 1 may be assembled with one another in a manner of the first foam layer 10 facing upwards or the third foam layer 30 facing upwards so as to distinguish use areas, such as a bodyweight training area and an exercise equipment area, which provides diverse arrangements and is convenient to use.

When the first foam layer 10 and the third foam layer 30 are under the same pressure during use as a floor mat, a deformed area of the first foam layer 10 is deep and narrow, and a deformed area of the third foam layer 30 is shallow and wide. FIG. 4 shows the size of the contact area between the first connecting surface 21 and the first foam layer 10 is larger than the size of the contact area between the second connecting surface 22 and the third foam layer 30 due to the different porosities of the layers and the different densities of cells within layer 20. More specifically, a density of a side of the second foam layer 20 adjacent to the first connecting surface 21 is larger than a density of a side of the second foam layer 20 adjacent to the second connecting surface 22 so that the first connecting surface 21 is tightly connected with the first foam layer 10 and is deformable corresponding to a pressed area of the first foam layer 10. The side of the second foam layer 20 adjacent to the second connecting surface 22 provides more compression space, which prevents the second connecting surface 22 and the third foam layer 30 from peeling off each other due to relative movement.

The second foam layer 20 is a closed-cell foam and includes a plurality of cells 24. The plurality of cells 24 are partially open toward the third foam layer 30 on the second connecting surface 22. The closed cells are partially opened due to heat damage during the heat welding step when second foam layer 20 and third foam layer 30 are jointed together. Heat damage does not occur on the first connecting surface 21 because first foam layer 10 and second foam layer 20 are not as hard as third foam layer 30 and therefore do not require the same heat and pressure conditions as third layer 30. The partially open cells on second connecting surface 22 improve the chemical bond with third foam layer 30. When the third foam layer 30 is pressed down during normal use, the second foam layer 20 is deformed by compression of the plurality of cells 24, which provides sufficient deformation space and prevents said layers from peeling off one another due to hardness difference. Moreover, it also avoids local depressions of the third foam layer 30 under pressure and provides good supporting effect.

A thickness of the second foam layer 20 is larger than or equal to a thickness of the first foam layer 10 and is smaller than a thickness of the third foam layer 30. Specifically, the thickness of the third foam layer 30 is at least twice the thickness of the second foam layer 20 so as to provide good supporting stability and shock absorption effect in use. The thickness of the second foam layer 20 is at least twice the thickness of the first foam layer 10 so as to have good cushioning effect. However, thicknesses of the first foam layer, the second foam layer and the third foam layer may be changed according to any requirements.

In this embodiment, the first foam layer 10 and the third foam layer 30 are made from materials including polyethylene (PE) and ethylene vinyl acetate copolymer (EVA), and a PE content of the first foam layer 10 is less than a PE content of the third foam layer 30 so that two opposite sides of the mat 1 have different hardness. EVA content of the first foam layer 10 is more than EVA content of the third foam layer 30 so that the first foam layer 10 has good anti-slip effect. The second foam layer 20 is made from materials including PE so that the hardness, thickness and elasticity of the second foam layer 20 are easy to be adjusted during manufacture. Specifically, when the third foam layer 30 faces upward and the first foam layer 10 contacts the ground, the first foam layer 10 provides better anti-slip effect when the mat 1 is pressed. For example, when an exercise equipment is placed on the third foam layer 30, the mat 1 is pressed by a weight of the exercise equipment, and a friction between the first foam layer 10 and the ground is increased so that the mat 1 is not easy to move.

Preferably, the first foam layer 10 and the third foam layer 30 are closed-cell structures, which is not easy to deform and is waterproof. A melting point of the second foam layer 20 is lower than melting points of the first foam layer 10 and the third foam layer 30. Therefore, the first connecting surface 21 and the second connecting surface 22 can be melted to be attached with the first foam layer 10 and the third foam layer 30 without any adhesive, which avoids odor and prevents structures of the first foam layer 10 and the third foam layer 30 from being damaged by heating. The first foam layer 10, the second foam layer 20 and the third foam layer 30 may further include inorganic fillers (such as calcium carbonate) so as to increase processing stability. In other embodiments, the first foam layer, the second foam layer and the third foam layer may be made from other materials, or added with dyes, plasticizers, etc.

The first foam layer 10 includes a plurality of blocks 11 embedded within one another, and the plurality of blocks 11 have at least two different colors so as to provide unique visual effect and preferable appearance (e.g., camo pattern). A surface of the first foam layer 10 opposite to the second foam layer 20 has an embossing structure 12 which provides anti-slip effect and good tactility. In other embodiments, the first foam layer may be a sheet with single color.

Figure 5:
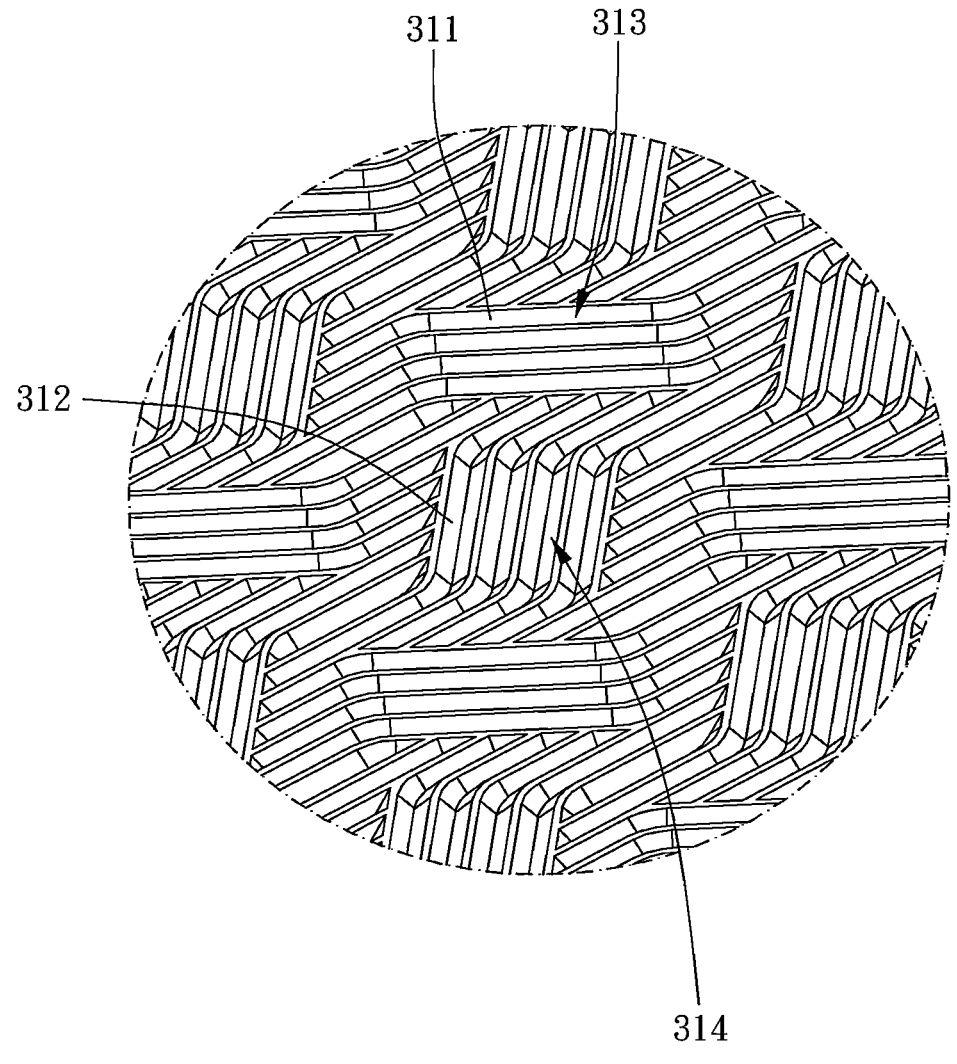
FIG. 5 is an enlarged view of the mat of FIG. 1.

FIG. 5 shows the third foam layer 30 having a contact surface 31 opposite to the second foam layer 20, and the contact surface 31 has a plurality of first grooves 311 and a plurality of second grooves 312 extending arcuately and recessed thereon. At least a portion of the plurality of first grooves 311 extends transversely to the plurality of second grooves 312. The plurality of first grooves 311 are arranged side by side and form a plurality of first units 313, and the plurality of second grooves 312 are arranged side by side and form a plurality of second units 314. The plurality of first units 313 and the plurality of second units 314 are alternatively arranged so as to have good anti-slip effect and unique appearance. However, the plurality of first grooves and the plurality of second grooves may be configured as wavy, polygonal, geometric, etc.

Figure 7:
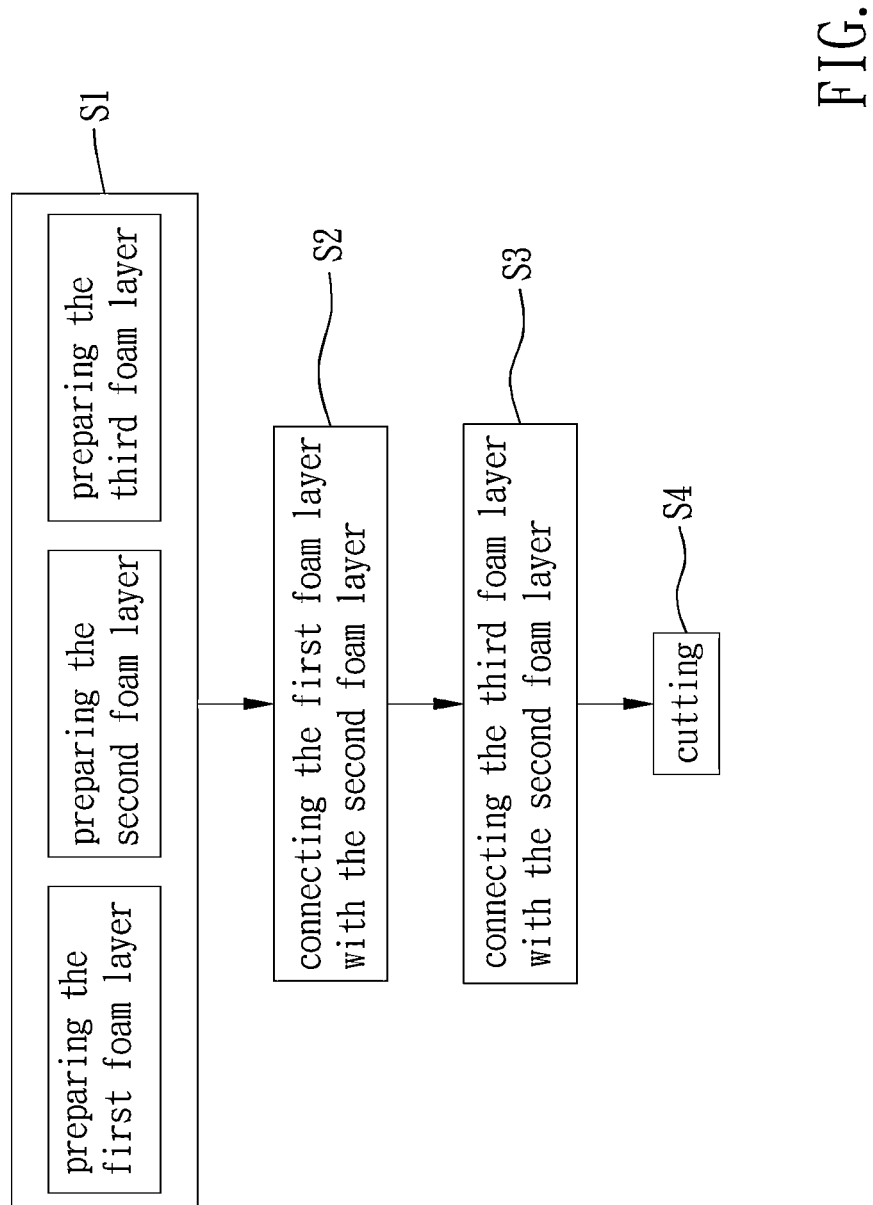
FIG. 7 is a flow chart of one embodiment of a method of manufacturing a mat.

FIG. 7 further provides a method for manufacturing the mat 1 as described above, including following steps. Step S1: preparing the first foam layer 10, the second foam layer 20 and the third foam layer 30 respectively by foaming; step S2: connecting the second foam layer 20 with one of the first foam layer 10 and the third foam layer 30 by thermo-compression; step S3: connecting the second foam layer 20 with the other of the first foam layer 10 and the third foam layer 30 by thermo-compression to form a substrate; and step S4: cutting the substrate to form at least one of the mat 1.

In the step S1 of preparing the first foam layer 10, this process may further include: preparing a mold; putting a plurality of raw material particles in the mold, wherein the plurality of raw material particles have at least two different colors, and the plurality of raw material particles may include PE resin particles and EVA resin particles; melting and foaming the plurality of raw material particles to form a foaming body; and taking out the foaming body from the mold and cutting the foaming body to form at least one of the first foam layer 10 having a predetermined thickness. Therefore, a plurality of said first foam layers 10 can be obtained by single foaming process, which is convenient to manufacture. Moreover, the first foam layers 10 have a dense foam structure and is waterproof and abrasion resistant, and the plurality of blocks 11 are arranged randomly to provide unique appearance.

In this embodiment, the second foam layer 20 is made by continues foaming so that the plurality of cells 24 have large diametrical dimensions and the second foam layer 20 has a relatively loose foam structure and good compressibility. The third foam layer 30 is made by mold foaming so as to have a dense foam structure and is hard, waterproof and abrasion resistant. In processing, the second foam layer 20 is connected with the first foam layer 10 first and then is connected with the third foam layer 30. For example, in the step S2, the first foam layer 10 is aligned with the first connecting surface 21, and the first connecting surface 21 is at least partially melted by a heating mechanism (such as heat gun). Then, the first foam layer 10 and the second foam layer 20 are pressed and attached to each other by a roller mechanism. The first foam layer 10 and the second foam layer 20 are flexible and soft, which is able to be rolled after combination and is convenient to process and storage.

Similarly, in the step S3, the third foam layer 30 is aligned with the second connecting surface 22, and the second connecting surface 22 is at least partially melted by the heating mechanism. Then, the first foam layer 10 and the second foam layer 20, which are already attached together, are pressed with the third foam layer 30 and attached to each other by the roller mechanism to form the substrate. In other embodiments, the second foam layer 20 may be attached to the third foam layer 30 first and then attached to the first foam layer 10 second; the first foam layer 10 or the third foam layer 30 may be melted so as to be connected with the first connecting surface 21 or the second connecting surface 22.

Although particular embodiments of the invention have been described in detail for purposes of illustration, various modifications and enhancements may be made without departing from the spirit and scope of the invention. Accordingly, the invention is not to be limited except as by the appended claims.

The recitation of ranges of values herein is merely intended to serve as a shorthand method of referring individually to each separate value falling within the range. Unless otherwise indicated herein, each individual value is incorporated into the specification as if it were individually recited herein, and ranges include their endpoints.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention. Unless a contrary meaning is explicitly stated, all ranges are inclusive of their endpoints, and open-ended ranges are to be interpreted as bounded on the open end by commercially feasible embodiments.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A mat, including:
a first foam layer, having a first hardness and a first porosity;

a second foam layer, connected with a side of the first foam layer, having a second hardness and a second porosity larger than the first porosity; and a third foam layer, connected with a side of the second foam layer opposite to the first foam layer, having a third hardness larger than both of the first hardness and the second hardness and a third porosity smaller than the first porosity;

wherein the second foam layer includes a first connecting surface facing the first foam layer and a second connecting surface facing the third foam layer, and a size of the contact area between the first connecting surface and the first foam layer is different from a size of the contact area between the second connecting surface and the third foam layer;

wherein a method for manufacturing the mat includes:
preparing the first foam layer, the second foam layer and the third foam layer respectively by foaming;
connecting the second foam layer with one of the first foam layer and the third foam layer by thermo-compression bonding at a substantially planar interface;
connecting the second foam layer with the other of the first foam layer and the third foam layer by thermo-compression bonding at a substantially planar interface to form a substrate; and
cutting the substrate to form at least one of the mat.

2. The method for manufacturing the mat of claim 1, wherein the step of preparing the first foam layer further includes following steps of:
preparing a mold;
putting a plurality of raw material particles in the mold, wherein the plurality of raw material particles have at least two different colors;
melting and foaming the plurality of raw material particles to form a foaming body; and
taking out the foaming body from the mold and cutting the foaming body to form at least one of the first foam layer having a predetermined thickness.

3. The method for manufacturing the mat of claim 1, wherein the second foam layer is made by continuous foaming.

4. The method for manufacturing the mat of claim 1, wherein the third foam layer is made by mold foaming.

5. The method for manufacturing the mat of claim 1, wherein the second foam layer is connected with the first foam layer first and then is connected with the third foam layer.

* * * * *